US012621342B2

(12) United States Patent
Bjarnason et al.

(10) Patent No.: US 12,621,342 B2
(45) Date of Patent: May 5, 2026

(54) SYSTEMS AND METHODS FOR POLICY DRIVEN DISTRIBUTED DENIAL OF SERVICE MITIGATION CHAINING

(71) Applicant: NetScout Systems, Inc., Westford, MA (US)

(72) Inventors: Steinthor Bjarnason, Fjerdingby (NO); Brian St. Pierre, Acworth, NH (US)

(73) Assignee: NetScout Systems, Inc., Westford, MA (US)

( * ) Notice: Subject to any disclaimer, the term of this patent is extended or adjusted under 35 U.S.C. 154(b) by 143 days.

(21) Appl. No.: 18/741,712

(22) Filed: Jun. 12, 2024

(65) Prior Publication Data

US 2025/0385936 A1      Dec. 18, 2025

(51) Int. Cl.
*H04L 9/40* (2022.01)

(52) U.S. Cl.
CPC ...... *H04L 63/1458* (2013.01); *H04L 63/1425* (2013.01)

(58) Field of Classification Search
CPC .................. H04L 63/1458; H04L 63/1425
See application file for complete search history.

(56) References Cited

U.S. PATENT DOCUMENTS

| | | | | |
|---|---|---|---|---|
| 12,231,403 | B2 * | 2/2025 | Devarajan ............... | H04L 67/10 |
| 12,395,573 | B1 * | 8/2025 | Sachdeva ............... | H04L 67/01 |
| 12,463,994 | B1 * | 11/2025 | Tock ................... | G06F 11/3438 |
| 12,489,771 | B1 * | 12/2025 | Erlingsson ............ | G06F 9/5072 |
| 12,513,115 | B2 * | 12/2025 | Moore ................ | H04L 63/0245 |
| 12,513,186 | B2 * | 12/2025 | Bernath .............. | H04L 63/1458 |
| 12,513,187 | B2 * | 12/2025 | Bjarnason ........... | H04L 63/1458 |
| 2020/0259792 | A1 * | 8/2020 | Devarajan ........... | H04L 63/1416 |
| 2021/0103487 | A1 * | 4/2021 | Rosales ............... | G06N 7/01 |
| 2025/0211568 | A1 * | 6/2025 | Sleeman ............... | H04L 63/20 |
| 2025/0211578 | A1 * | 6/2025 | Sleeman ............... | H04L 63/10 |
| 2025/0225253 | A1 * | 7/2025 | Godefroid ............ | G06F 21/577 |
| 2025/0233888 | A1 * | 7/2025 | Bransi ............... | H04L 63/20 |
| 2025/0240321 | A1 * | 7/2025 | St. Pierre ........... | H04L 43/0894 |
| 2025/0258749 | A1 * | 8/2025 | Melson ................ | G06F 11/362 |
| 2025/0260740 | A1 * | 8/2025 | Robinson ............ | H04L 67/1396 |
| 2025/0300969 | A1 * | 9/2025 | Bailey ................. | H04L 63/126 |
| 2025/0317454 | A1 * | 10/2025 | Bjarnason ........... | H04L 63/1416 |
| 2025/0317466 | A1 * | 10/2025 | Fry ................... | H04L 41/16 |
| 2025/0317477 | A1 * | 10/2025 | Ruta .................. | H04L 63/0263 |
| 2025/0323953 | A1 * | 10/2025 | Crabtree ............. | H04L 61/4511 |
| 2025/0365310 | A1 * | 11/2025 | Bjarnason ........... | G06F 21/6218 |

* cited by examiner

*Primary Examiner* — Stephen T Gundry
(74) *Attorney, Agent, or Firm* — Foley & Lardner LLP

(57) ABSTRACT

A system includes instructions that cause processors to store a directed acyclic graph including nodes comprising selector nodes, mitigator nodes, and actor nodes, each of the nodes linked to another node, receive a data packet, inspect, using a selector node, a header of the data packet to determine a protection group, tag the data packet with an identification of the protection group based on the inspection, apply, using a mitigator node, criteria of a protection group policy corresponding to the protection group to the data packet based on the identification of the protection group tagged to the data packet, tag the data packet with a mitigation flag corresponding to a mitigation measure selected based on the application of the criteria of the protection group policy to the data packet, and apply, using an actor node, the mitigation measure corresponding to the mitigation tag to the data packet.

20 Claims, 8 Drawing Sheets

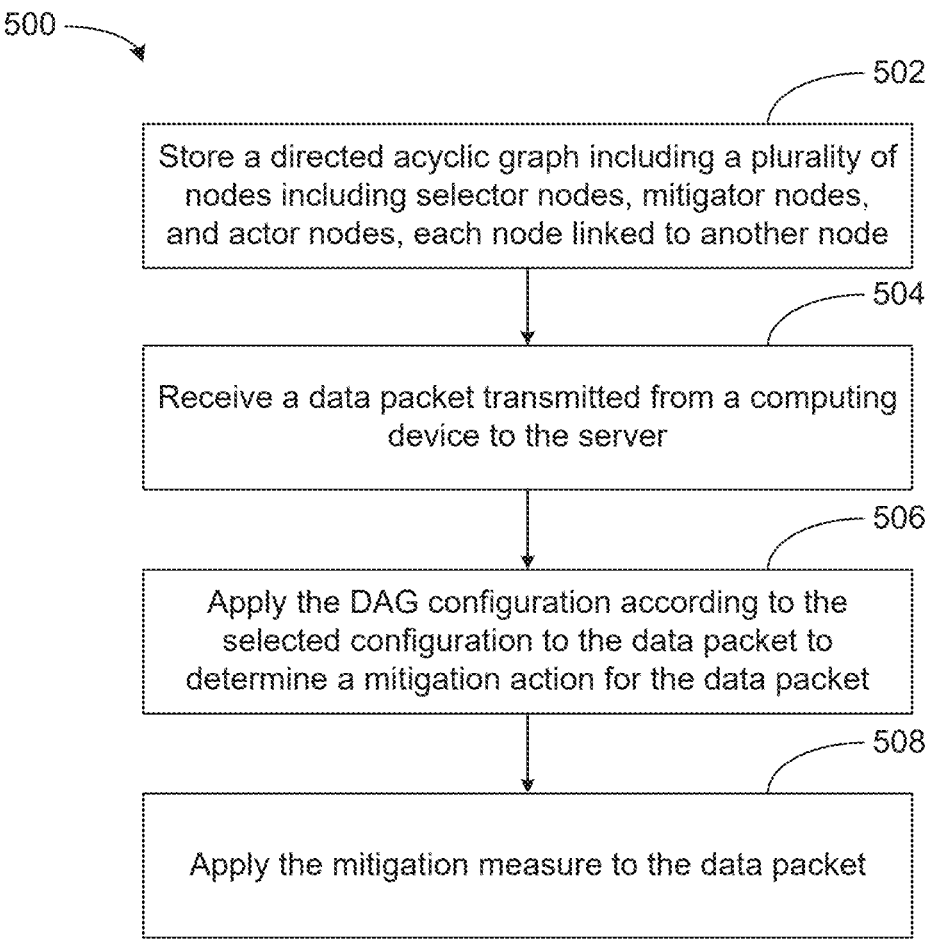

500

502

Store a directed acyclic graph including a plurality of nodes including selector nodes, mitigator nodes, and actor nodes, each node linked to another node

504

Receive a data packet transmitted from a computing device to the server

506

Apply the DAG configuration according to the selected configuration to the data packet to determine a mitigation action for the data packet

508

Apply the mitigation measure to the data packet

FIG. 5

SYSTEMS AND METHODS FOR POLICY DRIVEN DISTRIBUTED DENIAL OF SERVICE MITIGATION CHAINING

BACKGROUND

Distributed denial of service (DDoS) attacks are used by malicious actors to deny access to a given network service. A class of DDoS attacks focus on an application layer. These application layer attacks may involve attacking a specific application, such as web servers, session initiation protocol (SIP) voice services, and/or a Domain name System (DNS), among others. A set of mitigation methods may be applied to network traffic to classify and remove malicious actors.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 5 is an illustration of a flow diagram of a method for configuring a directed acyclic graph to mitigate a DDoS attack, in accordance with an implementation;

DETAILED DESCRIPTION

Figure 1:
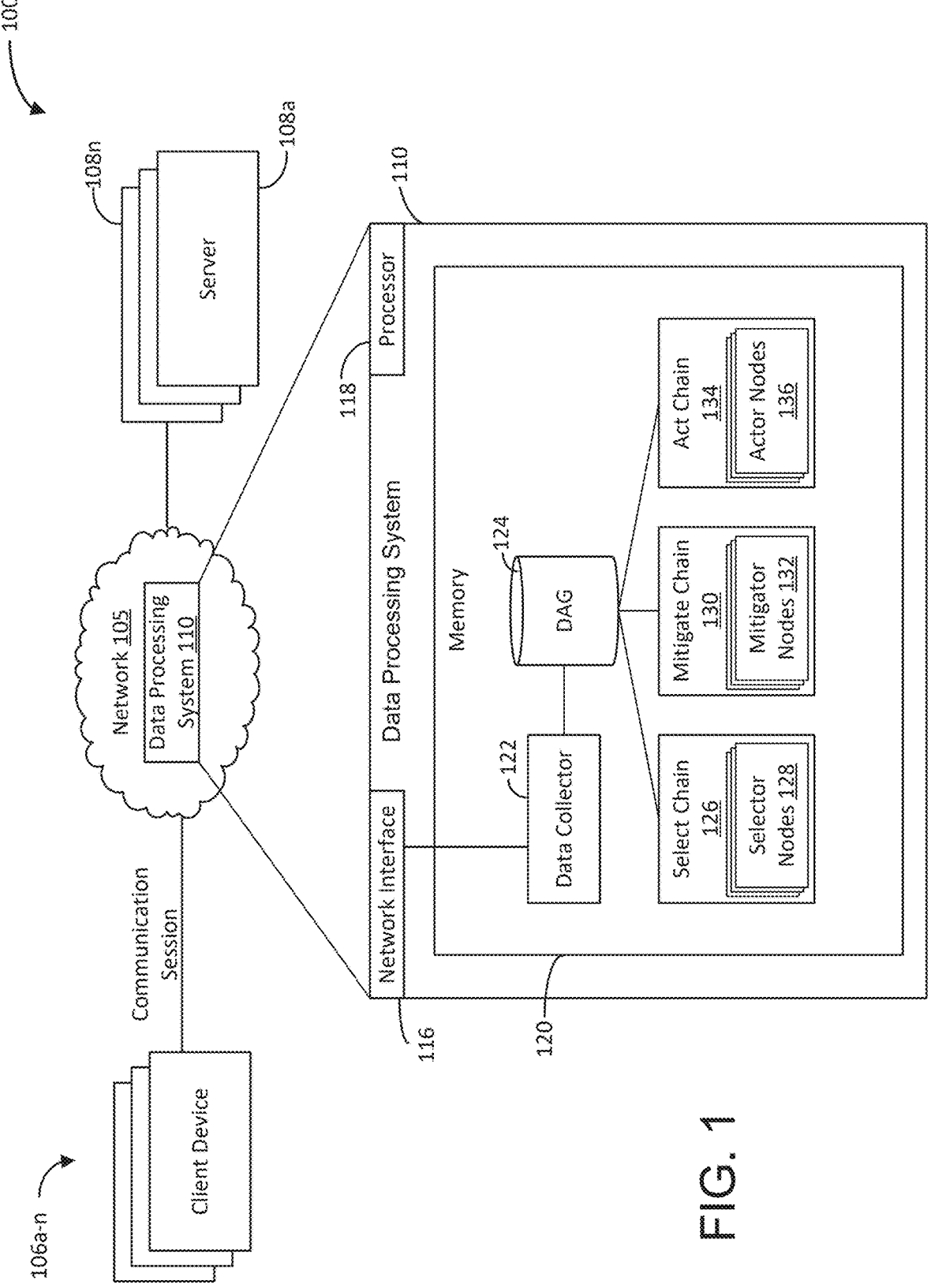
FIG. 1 is an illustration of a system for DDoS attack mitigation using a directed acyclic graph, in accordance with an implementation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Distributed denial of service (DDoS) attacks are used by malicious actors to deny access to a given network service. The malicious actors may be blocked or otherwise have their communication between the actors and a server mitigated to prevent an attack on the server. Traditionally, DDoS mitigation may be performed by applying a static set of mitigation methods to network traffic. Each method may utilize a unique method to classify malicious traffic and subsequently remove the malicious traffic. This may be effective in removing malicious actions, but a static set of rules may be limiting. Further, it may be preferable to be able to reorder the rules arbitrarily, or to add extra conditions around when certain rules are implemented.

The systems and methods described herein may define a generalized data packet processing system in which "inspectors" can apply tags to data packets. The system may include a data processing system that monitors a communication session between a client device and a server that occurs over a network. The client device may transmit data packets to and from the server. The data processing system can retrieve the transmitted data packets and inspect the information stored in the data packet. The data processing system may include a directed acyclic graph (DAG) containing a plurality of inspector nodes. The inspector nodes can apply tags to the data packet and forward the data packet to subsequent nodes corresponding to the applied tags. For example, the tags may, for example, indicate where (e.g., to which node) in the DAG the data packet should be forwarded, what the data packet information contains, and/or any actions that should be taken by subsequent nodes. For example, a data packet may be tagged with a tag indicating that the data packet is malicious and should be dropped by the system so the data cannot reach the server. Thus, a specific inspector node may inspect the data packet based on which tags are associated with the data packet and perform an action or process based on the presence or absence of a specific tag corresponding to the specific role of the inspector. For example, a specific inspector may be configured to drop any data packets tagged with an instruction to be dropped. Upon inspecting a data packet tagged with a "drop" tag, the specific inspector may drop the data packet from the communication session. By adding a tag to a packet, an inspector may influence a subsequent set of inspectors that run. The systems and methods described herein may dynamically build arbitrary packet processing rule sets.

The DAG stored in the data processing system may be configurable depending upon content of a messaged received by the data processing system. For example, the data processing system may execute the DAG against an input (e.g., data packets transmitted between a client device and a server). Thus, based on the specific data packets being transmitted and associated information (e.g., information contained in the data packets, tags associated with the data packet, etc.), the DAG may be executed differently for different data packets.

FIG. 1 is an illustration of a system 100 for policy-driven DDoS attack mitigation, in accordance with an implementation. The system 100 may enable mitigation of DDoS attacks by utilizing dynamic and reconfigurable rules that can be implemented in client mitigation efforts. In brief overview, the system 100 can include, access, or otherwise interface with one or more of a data processing system 110 (e.g., a probe, an inspection device), that receives and/or stores data packets transmitted via a network 105 between client devices 106a-n (hereinafter client device 106 or client devices 106) and servers 108a-n. The servers 108 can each include a set of one or more servers 602, depicted in FIG. 6A, or a data center 608. The client device 106 may be an example of a user equipment (UE) or another device that can access the network 105. The client device 106 can communicate with the servers 108 to access a service (e.g., a website, an application, etc.). The client device 106, the server 108, and the data processing system 110 can communicate or interface with via the network 105 or directly.

Each of the client devices 106, the servers 108, and/or the data processing system 110 can include or utilize at least one processing unit or other logic device such as programmable logic array engine, or module configured to communicate with one another or other resources or databases. The components of the client devices 106, the servers 108, and/or the data processing system 110 can be separate components or a single component. In some embodiments, the data processing system 110 may be an intermediary device between the client devices 106 and the servers 108. In some embodiments, the server 108 and the data processing system 110 may share at least some components or be the same device. The system 100 and its components can include hardware elements, such as one or more processors, logic devices, or circuits.

The client devices 106, the servers 108, and/or the data processing system 110 can include or execute on one or more processors or computing devices (e.g., the computing device 603 depicted in FIG. 6C) and/or communicate via the network 105. The network 105 can include computer networks such as the Internet, local, wide, metro, or other area networks, intranets, satellite networks, and other communication networks such as voice or data mobile telephone networks. Via the network 105, the client device 106 can access information resources such as web pages, web sites, domain names, or uniform resource locators that can be presented, output, rendered, or displayed on at least one computing device (e.g., client device 106), such as a laptop, desktop, tablet, personal digital assistant, smart phone, portable computers, or speaker. For example, via the network 105, the client devices 106 can communicate with the servers of the servers 108 for data (e.g., a communication session including requests from the client devices 106 and responses from the servers 108).

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS"), universal mobile telecommunications system ("UMTS"), 3G, 4G, long term evolution wireless broadband communication ("LTE"), 5G, etc. Different types of data may be transmitted via different protocols, or the same types of data may be transmitted via different protocols. In some embodiments, the network 105 may be or include a self-organizing network that implements a machine learning model to automatically adjust connections and configurations of network elements of network 105 to optimize network connections (e.g., minimize latency, reduce dropped calls, increase data rate, increase quality of service, etc.).

The server 108 can be hosted by a third-party cloud server via a virtual environment. The server 108 can be hosted in a public cloud, a co-location facility, or a private cloud. The server 108 can be hosted in a private data center, or on one or more physical servers, virtual machines, or containers of an entity or customer. The servers 108 may each be or include servers or computers configured to transmit or provide services across network 105 to client devices 106. The servers 108 may transmit or provide such services upon receiving requests for the services from any of the client devices 106. The term "service" as used herein includes the supplying or providing of information over a network and is also referred to as a communications network service. Examples of services include 5G broadband services, any voice, data or video service provided over a network, smart-grid network, digital telephone service, cellular service, Internet protocol television (IPTV), etc. The service may further include a SaaS application, such as a word processing application, spreadsheet application, presentation application, electronic message application, file storage system, productivity application, or any other SaaS application. The server 108 can be hosted or refer to cloud 610 depicted in FIG. 6B.

The client device 106 can establish communication sessions with the servers 108 to receive data from the servers 108. For example, a user associated with the client device 106 may request a service. Responsive to the request, a cloud provider 108 associated with the service may send requested data to the client device 106 in a communication session. The client devices 106 may establish communication sessions with the cloud providers 108 for any type of application or for any type of call. In various embodiments, the client device 106 may be a malicious device used to initiate a DDoS attack on the server 108.

The client device 106 can be located or deployed at any geographic location in the network environment depicted in FIG. 1. The client device 106 can be deployed, for example, at a geographic location where a typical user using the client device 106 would seek to connect to a network (e.g., access a browser or another application that requires communication across a network). For example, a user can use a client device 106 to access the Internet at home, as a passenger in a car, while riding a bus, in the park, at work, while eating at a restaurant, or in any other environment. The client device 106 can be deployed at a separate site, such as an availability zone managed by a public cloud provider (e.g., a cloud 610 depicted in FIG. 6B). If the client device 106 is deployed in a cloud 610, the client device 106 can include or be referred to as a virtual client device or virtual machine. In the event the client device 106 is deployed in a cloud 610, the packets exchanged between the client device 106 and the servers 108 can still be retrieved by the data processing system 110 from the network 105.

The data processing system 110 may comprise one or more processors that are configured to perform mitigation measures (e.g., blocking data packets) by blocking incoming data packets during a communication session between the client device 106 and the servers 108. The data processing system 110 may comprise a network interface 116, a processor 118, and/or memory 120. The data processing system 110 may communicate with any of the client devices 106, and/or the servers 108 via the network interface 116. In some embodiments, the data processing system 110 is stored in the network 105. Thus, the data processing system 110 may affect data packets being transmitted to and from the client device 108 and the server 108 in real-time (e.g., as the data packets are transmitted). The processor 118 may be or include an ASIC, one or more FPGAs, a DSP, circuits containing one or more processing components, circuitry for supporting a microprocessor, a group of processing components, or other suitable electronic processing components. In some embodiments, the processor 118 may execute computer code or modules (e.g., executable code, object code, source code, script code, machine code, etc.) stored in the memory 120 to facilitate the operations described herein. The memory 120 may be any volatile or non-volatile computer-readable storage medium capable of storing data or computer code.

The memory 120 may include one or more of a data collector 122, a directed acyclic graph (DAG) 124, a select chain 126 including one or more selector nodes 128, a mitigate chain 130 having one or more mitigator nodes 132, and an act chain 134 having one or more actor nodes 136. The data processing system 110 may further include other components, managers, handlers, etc. to perform the techniques as described herein. In brief overview, the components 122-136 may process a data packet transmitted to the server 108 by the client device 106 and generate a set of tags associated with the data packet. Depending on the generated tags, the data packet may move through the DAG in various configurations and may be processed differently.

The data collector 122 may comprise programmable instructions that, upon execution, cause the processor 118 to obtain (e.g., receive, collect) data transmitted between the client devices 106 and the servers 108 as part of a communication session. For example, the client device 106 may send a request for a service to the server 108. The server 108 may send a response to provide the service to the client device 106. The client device 106 may transmit a plurality of data packets to the server 108 via the network 105 during an established communication session. Each data packet may include a header, a payload, and, in some cases, a trailer. The header may include information such as source and control destinations and the type of data being transmitted. The payload may include the actual data to be transmitted during the communication session. The trailer may include error-checking information. The data collector 122 may receive the data packet(s) transmitted from the client device 106 to the server 108. The data collector 122 may also transmit the data packet to the DAG 124, which will be described herein.

The DAG 124 may comprise programmable instructions that, upon execution, cause the processor 118 to process a data packet sent by the client device 106 to mitigate an attack on the server 108 by the client device 106 via the data packet. The DAG 124 may include a plurality of nodes, also referred to as "inspectors" or "inspector nodes," that may inspect the data packet. Specifically, inspector nodes may include selector nodes 128, mitigator nodes 132, and/or actor nodes 136. The inspector nodes may apply tags to the data packet. By adding a tag to a data packet, an inspector may be able to influence a subsequent set of one or more nodes that run in the DAG 124 and affect processing of the data packet. Prior to operating on any input DAG 124, the data processing system 110 may verify that the DAG 124 is acyclic (e.g., free of cycles) to confirm that termination of the process will occur.

Referring now to components 126-136, example chains and corresponding inspector nodes are shown. A chain may be a group or category of inspector nodes. Each chain may include one or more inspector nodes belonging to the identified category. Specifically, a select chain 126, a mitigate chain 130, and an act chain 134 are shown. Each chain may include a plurality of nodes or inspectors corresponding to the chain category. For example, the select chain 126 includes a plurality of selector nodes 128, the mitigate chain includes a plurality of mitigator nodes 132, and the act chain includes a plurality of actor nodes 136. Each node may perform a different function. Further, as stated above, each node may include a set of excluded tags and/or a set of required tags. The DAG 124 may contain additional or alternative inspector nodes. A plurality of each type of node may comprise a chain. For example, in a "select" chain 126, a plurality of selector nodes 128 may be utilized and may inspect the data packet. Similarly, in a "mitigate" chain 130, a plurality of mitigator nodes 132 may be utilized and may inspect the data packet. In an "act" chain 134, a plurality of actor nodes 136 may be utilized and may perform some action with respect to the data packet. In various embodiments, for each chain, the order of the nodes through which the data packet is passed may indicate an importance of the inspector node. For example, a first selector node 128 may tag the data packet and indicate that the data packet should be further inspected. As the data packet moves through the plurality of mitigator nodes 130, additional computer resources may be spent to determine whether the data packet should be dropped (e.g., determine whether the data packet is malicious). Thus, in various embodiments, a data packet may not be further inspected by additional nodes in a given chain if the data packet has been tagged as malicious or "bad" upstream in the chain. For example, when a first mitigator node 130 in the mitigate chain 130 tags a data packet as malicious, the remaining subsequent mitigator nodes 130 in the chain may not inspect the data packet and instead drop the data packet. Example selector, mitigator, and actor nodes and their corresponding functions are described below.

When processing a data packet, the system may generate a set of tags (e.g., a tag set) that is associated with the data packet. The tag set may initially contain only a "default" tag. The tags for a data packet may be metadata corresponding to the packet, and the metadata may follow the packet through the system. In various embodiments, the metadata may be located elsewhere in the system (e.g., not following the data packet), and the data packet may include an identifier that can be used to map the metadata to the data packet. The system may begin processing the data packet at a root node of the DAG 124. Each inspector node may contain a set of "required" tags, a set of "excluded" tags, a processing function, and/or a default next-node. The set of required tags may include one or more elements that the data packet must be tagged with in order for the inspector node to inspect the data packet. The set of excluded tags may include one or more tags that indicate that the inspector may only inspect the data packet if the data packet is not tagged with that specific tag. The processing function may include an action associated with the inspector that is to be performed. The default next-node may be a node that moves the data packet to a subsequent inspector node. In various embodiments, the order in which the inspector nodes inspect a data packet may be configurable depending upon the tags that the data packet is tagged with.

For each node, the DAG 124 may calculate the set-intersection of node.tags (e.g., tags with which the data packet is tagged) and packet required-tags (e.g., required tags as indicated by the inspector node). Responsive to a determination that the set-intersection is empty (e.g., there is no intersection between the tags of an inspector node and the tags the data packet is tagged with), the node may be skipped, and the default next-node may be considered. In various embodiments, if a specific node is to inspect all data packets, the specific node may utilize a set containing the "default" tag. Since every data packet in the DAG 124 may be tagged with a default tag, this may ensure that the data packet is inspected by the specific node.

A node that is inspecting the data packet may invoke a processing function with pointers to the data packet, the set of tags, and a global state. The processing function may inspect the packet and may modify the set of tags and/or the global state. The processing function may return a value that may indicate various possibilities. For example, the processing function may return a "continue" value with the default next-node. This may be a typical return value. The inspector node's default next-node may then be considered. Thus, the data packet may be passed on to a subsequent or next node responsive to the processing function of a specific node returning a continue value. The processing function may also return a "branch" value to a specific next-node. This can be used to pass control to an alternative branch of the DAG. In various embodiments, branching may be a forward process only (e.g., control may only be passed to a future node, not a previous node). For example, a data packet may be processed by a selector node 128. Responsive to the selector node 128 returning a continue value, the data packet may subsequently be processed by a second selector node 128 in the select chain 126. However, in various embodiments, the selector node 128 inspecting the data packet may include a processing function that returns a branch value. The branch value may indicate that the data packet should be processed by an actor node 136 in the act chain 134 rather than the subsequent second selector node 128. In various embodiments, the processing function may also return an "abort" value. This may cause all subsequent nodes in the DAG 124 to be skipped so that the data packet is no longer inspected by the DAG 124. Processing may then continue with a next data packet. For example, a mitigator node 132 may return an abort value. The data packet may then be blocked or dropped from the DAG 124.

In various embodiments, each tag may have a name. The name may be a string. Each tag may have an optional associated value, which may also be a string. In various embodiments, tags and values may be, for example, 8-byte integers, which may be treated as length-restricted strings. When set-intersections are computed, only the tag names may be used. When inspectors run, the inspectors may retrieve a full set of tags. The inspectors may also be able to extract a name and value associated with each tag.

Selector nodes 128 may, in various embodiments, be the first nodes through which the data packets are passed. The DAG 124 may be configurable such that the selector nodes 128 are not the first nodes through which the data packets are passed. The selector nodes 128 may perform a shallow inspection of the data packet. The selector nodes 128 may add tags to the data packet that specify a subsequent set of inspectors to run. In various embodiments, a network may be divided into protection groups. The protection groups may be based on ranges of IP addresses of the server devices 108. Thus, in various embodiments, while being inspected by the selector nodes 128, a protection group (PG) inspector may run on every data packet. The PG inspector may inspect a destination IP address of the data packet. The PG inspector may also check a global state for a mapping of CIDR-to-PGID (protection group identifier). Responsive to the destination IP existing in one of the CIDRs in the mapping, the tag set may be updated with a PG tag containing the value of the PGID from the mapping. Thus, the PG tag may indicate a protection group of the data packet. The protection group that the data packet is determined to belong to may govern a particular configuration for the data packet. The PG inspector may return "continue," indicating that the data packet should be forwarded to the next node in the DAG 124.

A blocklist inspector may be a type of selector node 128. The blocklist inspector may contain required-tags={PG}. Thus, to be inspected by the blocklist inspector, the data packet may be required to have a {PG} tag. The blocklist inspector may inspect a source IP address of the data packet. The blocklist inspector may also check the global state for a blocklist associated with the PGID. The blocklist may include a list of source IP addresses of client devices 106 that may be malicious and should therefore be dropped by the data processing system 110 so that the client device 106 is unable to perform an attack on the server 108. Responsive to the source IP address being present in the blocklist, the blocklist inspector may set a drop tag, indicating that the data packet be dropped. If the drop tag is not set, no action taken may be taken and the blocklist inspector may return "continue."

A dispatch inspector may also be a type of selector node 128. The dispatch inspector may branch to a desired mitigation chain for the PG. The dispatch inspector may include required-tags={PG}. Thus, if no PG is tagged, processing may fall through to the act chain 134 (e.g., an action is performed). Otherwise, the dispatch inspector may determine a node corresponding to a head of the node chain for the given PG. The dispatch inspector may return "branch" as the next-node.

A no-op inspector may also be a type of selector node 128. In various embodiments, the no-op inspector may be run as a last selector node in the select chain 126 (e.g., the chain including the plurality of selector nodes 128). The no-op inspector may include the default next-branch set to the beginning of the act chain 134 (e.g., the beginning or first of the actor nodes 136). In various embodiments, if the dispatch inspector did not branch to a PG mitigation chain, then the no-op selector node may run and processing may continue with the act chain (e.g., skipping the mitigator nodes 132 and moving to the actor nodes 136).

In various embodiments, additional or alternative selector nodes 128 may be possible, such as, for example, a source IP address-based PG selector or a selector that drops packets with a certain protocol or VLAN marking. The order of the selector nodes 128 may be configurable.

In various embodiments, the mitigate chain 130 may include a plurality of mitigator nodes 132. The mitigator nodes 132 may run subsequent to the select chain 126/the selector nodes 128. The mitigator nodes 132 may be run in sequence as a group. The mitigator nodes 132 may inspect certain data packets depending upon which tags were set for the data packet by the selector nodes 128. For example, the mitigator nodes 132 may inspect a data packet having a protection group tag set by the selector nodes 128. The mitigator nodes 132 may determine if the data packet is in a particular protection group and what protection group policy governs the protection group. The mitigator nodes 132 may also determine if a specific mitigator node 132 is enabled in the configuration for the particular protection group of the data packet. For example, the mitigator node(s) 132 may identify the PG tag of the data packet, inspect a head node of the protection group based on the PG tag, and return the head node as a branch target (e.g., the next node that inspects the data packet). Responsive to a determination that the specific mitigator node(s) 132 are enabled, the mitigator nodes 132 may inspect the data packet. In various embodiments, the mitigator nodes 132 may run in a fixed order against data packets that have matched certain selector node 128 criteria. Mitigator nodes 132 may add tags to the data packet that influence the actions of the actor nodes 136. The tags may also influence other mitigator nodes 132 that are later in the sequence.

In various embodiments, mitigator nodes 132 may include the PG tag in the required-tags. The mitigator nodes 132 may also look up a PG configuration (e.g., a protection group policy) from the global state using, for example, a PGID value associated with the PG tag. Mitigator nodes 132 may also include "drop" in the excluded-tags, since additional mitigation may not be performed on packets that have already been tagged as data packets that will be dropped.

An access control list (ACL) inspector may be a type of mitigator node 132. The ACL inspector may retrieve an ACL rule from the PG configuration and may process the data packet against the rule. Responsive to a determination that the data packet matches the rule, the ACL inspector may set a drop flag and return "continue." The drop flag may indicate that the data packet is to be dropped.

A regular expression (regex) inspector may be a type of mitigator node 132. The regex inspector may retrieve a regex from the PG configuration and may process the data packet against the regex. Responsive to a determination that the data packet matches the regex, the regex inspector may set a drop flag and may return "continue."

A zombie inspector may be a type of mitigator node 132. The zombie inspector may utilize the data packet's source IP address to determine a source-state entry from the PG configuration. The zombie inspector may create a source-state entry responsive to a determination that no entry exists. The zombie inspector may decrement a token bucket in the source-state entry. If the token bucket is empty, the source IP may be transmitting packets at a rate greater than or equal to a threshold rate. The zombie inspector may set a drop flag (indicating that the packet be dropped) and a block flag (indicating that future packets sent with the source IP address of the client device 106 be dropped) and may return "continue."

A DNS malformed inspector may be a type of mitigator node 132. The DNS malformed inspector may include domain name system (DNS) in the required-tags. The DNS malformed inspector may inspect the packet according to a set of well-formedness rules. Responsive to a determination that the packet violates any of the well-formedness rules, the DNS malformed inspector may set a drop flag, remove a DNS tag, and return "continue."

A DNS scope inspector may be a type of mitigator node 132. The DNS scope inspector may be used to conditionally perform a chain of inspectors. The DNS scope inspector may include DNS in the set of required-tags. The DNS scope inspector may retrieve a regex from the PG configuration. The DNS scope inspector may also process a DNS name of the data packet against the regex. Responsive to a determination that the name matches, the DNS scope inspector may set the DNS scope tag and return "continue."

A DNS regex inspector may be a type of mitigator node 132. The DNS regex inspector may use a scoping tag to conditionally perform inspection. In various embodiments, conditional inspection may be desired. Thus, the DNS scope tag may be added to the required-tags. If conditional inspection is not desired, the DNS tag may be added to the required-tags. The DNS regex inspector may retrieve a regex from the PG configuration. The DNS regex inspector may also process a DNS name of the data packet against the regex. Responsive to a match between the name and the regex, the DNS regex inspector may set a drop tag and return "continue."

Mitigator nodes 132 may include conditional behavior. For example, the DNS regex inspector may set both drop and block tags based on a configuration of the DAG 124. In various embodiments, multiple instances of the same inspector could be added to the DAG 124. For example, the DAG 124 may include a plurality of DNS scope tags using varying values. Scoping may be performed on different aspects of data packets. For example, scoping may occur by determining a geo-IP country of origin or by determining by an ASN. A mitigator node 132 may determine that data the packet should be forwarded without being subject to any additional inspection by the mitigator nodes 132 by returning a branch value with the next-node at the head of the act chain 134 (e.g., at the beginning of the actor nodes 136).

In various embodiments, the actor nodes 136 may run subsequent to the selector nodes 128 and the mitigator nodes 132. The actor nodes 136 may cause actions to occur relative to the data packet. For example, the actor nodes 136 may cause the inspected packets previously tagged (for example, by the selector nodes 128 and/or the mitigator nodes 132) to be dropped, blocked, transmitted, etc. The actor nodes 136 may also result in the mitigator nodes 132 generating additional packets, for example to send a challenge to a client device 106. While the data packet is inspected by the actor nodes 136, one or more actions may be performed on the data packets. In various embodiments, actions that return abort may be positioned at an end of a chain of actor nodes 136 so that prior actions may be run before the data packet is aborted.

A forward inspector may be a type of actor node 136. The forward inspector may include excluded-tags={drop, block, encaps}. The forward inspector may forward the data packet toward a destination. The forward inspector may return "abort."

A generic routing encapsulation (GRE) inspector may be a type of actor node 136. The GRE inspector may include excluded-tags={drop, block} and required-tags={encaps, GRE}. The GRE inspector may add GRE encapsulation to the data packet. The GRE inspector may also forward the data packet. The GRE inspector may return "abort."

A drop inspector may be a type of actor node 136. The drop inspector may include required-tags={drop}. The drop inspector may increment a drop statistic. The drop inspector may also drop the data packet. The drop inspector may return "abort."

A ratelimit inspector may be a type of actor node 136. The ratelimit inspector may include required-tags={rate}. The ratelimit inspector may utilize a value of the tag to determine a rate limiter from the global state. The ratelimit inspector may also test the data packet against the rate. The ratelimit inspector may set a drop flag responsive to a determination that the rate is at or above a predefined threshold value.

A block inspector may be a type of actor node 136. The block inspector may include required-tags={PG, block}. The block inspector may add a source IP of the data packet to the blocklist for a PGID associated with the PG tag.

A reset inspector may be a type of actor node 136. The reset inspector may include required-tags={reset}. The reset inspector may generate and transmit a transmission control protocol (TCP) reset packet to the destination IP/port in the data packet. This may be utilized when a source is going to be blocked, but the source has already set up a connection to the server 108. In various embodiments, removing a connection with a reset packet may allow the server 108 to conserve resources.

The actor nodes 136 may be or include additional or alternative nodes. For example, a "flow blocking" inspector may add a 5-tuple to a blocklist that can be used by an earlier inspector node to mark subsequent matching packets as dropped. Other encapsulation or decapsulation inspectors may be added. Other forwarding inspectors could be added. The forwarding inspectors may utilize routing lookups to forward packets along specific paths. Early-decision allow-listing may be implemented with an inspector that adds addresses to an allow list that can be used by a selector node 128 to tag packets as forward, thus skipping the mitigate chain 130.

As previously stated, the configuration of the DAG 124 may be variable. For example, the DAG 124 may include any combination of chains, and, within each chain, any combination of nodes. For example, a configuration of the DAG 124 may include an actor chain configured to forward every data packet without mitigating any of the data packets. The configuration of the DAG 124 may be based on a message received about the client device 106 communicating with the server 108. In various embodiments, an order or configuration of the DAG 124 may be generated as an output of another system. For example, a probe external to the system 100 may detect certain actions (e.g., attacks). As an output, the probe may generate an indication, to be received by the data processing system 110, that the DAG 124 should be configured based on the attack determined by the probe. This may affect which types of nodes are utilized, for example, in the select chain 126. Further, the mitigator nodes 132 may be used to inspect code written in the data packets to identify which data packets are malicious and should be dropped, versus which data packets are not malicious and can be forwarded through.

In various embodiments, the order in which the chains and/or nodes are configured may be variable depending upon a use of the system 100. For example, in one embodiment, the DAG 124 may be configured such that, when a particular protection group is identified, none of the data packets having that protection group are dropped, and the only node in the DAG 124 indicates that the data packets should be forwarded. Further, in some embodiments, only data packets having certain tags may be dropped, and all other data packets may be forwarded. In various embodiments, the DAG 124 may be configured to implement certain protections against attacks from one or more devices.

In various embodiments, the DAG 124 may be used to detect an attack rather than to identify malicious data packets in an ongoing attack. For example, the DAG 124 may be configured such that the mitigator nodes 132 do not tag any data packets to be dropped. Rather, the mitigator nodes 132 may tag the data packets with tags indicating an ongoing attack. When the tagged data packets are received, for example, by the actor nodes 136, the actor may not drop any data packets. The data packets may be tagged such that the actor nodes 136 write files to alert users of the ongoing attack.

In various embodiments, the DAG 124 may be configured to enable protections for a particular protection group. The DAG 124 may be configured to identify which data packets belong to the particular protection group. The DAG 124 may also be configured to include an additional mitigator node 132 that tags data packets belonging to the particular protection group with an indication that an actor node 136 should drop the data packet.

Figure 2:
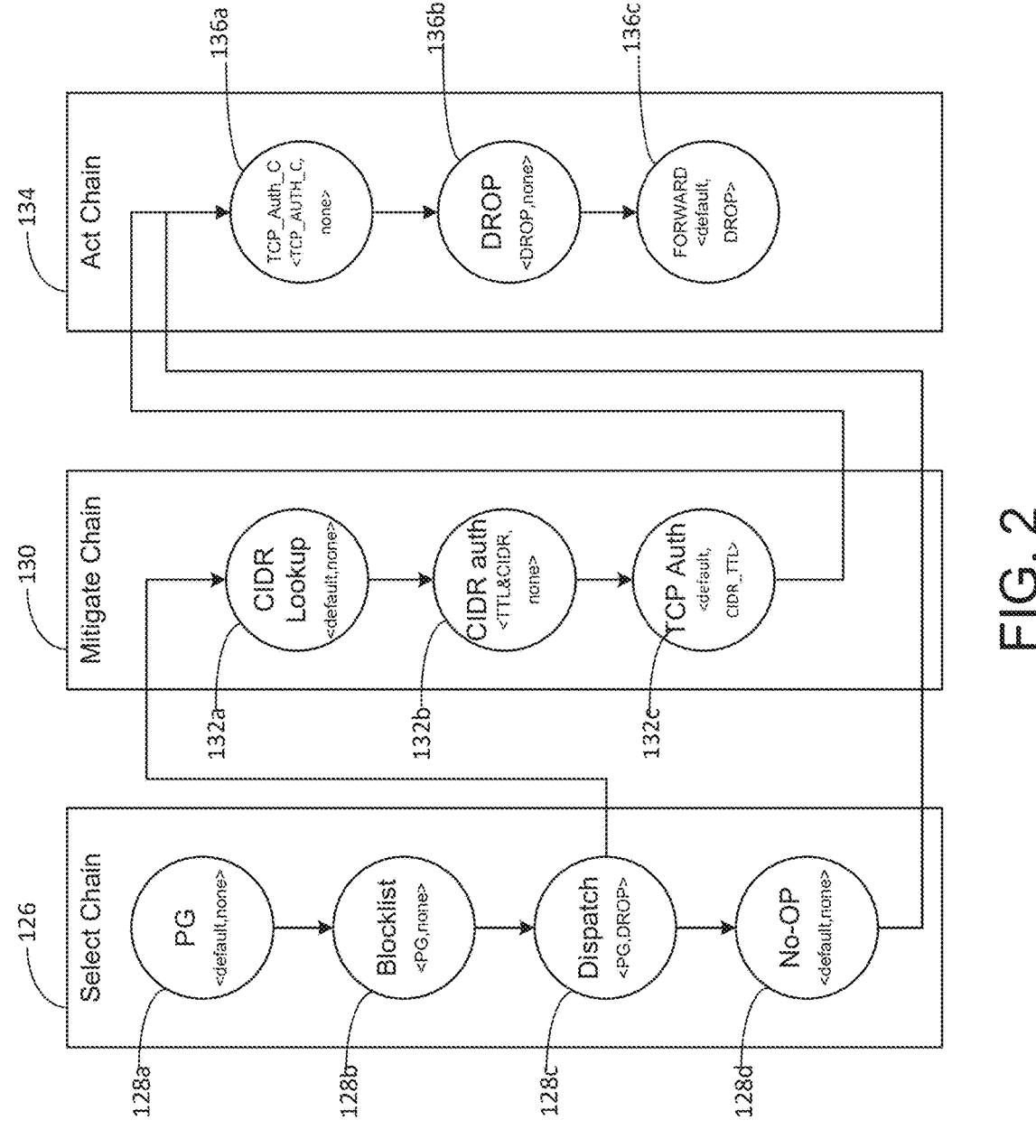
FIG. 2 is an illustration of a diagram of a system for DDoS mitigation using a directed acyclic graph, in accordance with an implementation.

Referring now to FIG. 2, a block diagram of a system 200 for processing a data packet using a DAG is shown, according to an example embodiment. A data packet may be identified during a communication session between a client device 106 and the server 108. The data packet may be inspected by a plurality of inspector nodes to determine whether the data packet is from a malicious client device 106. The system 200 may include the select chain 126 having a plurality of selector nodes 128a-d, the mitigate chain 130 having a plurality of mitigator nodes 132a-c, and an act chain 134 having a plurality of actor nodes 136a-c.

The data packet may first be processed by the select chain 126 and a plurality of selector nodes 128a-d within the select chain 126. Within each node 128, 132, and 136, the node indicates the type of node/inspector (e.g., a PG inspector). Within the brackets, the node may indicate required tags and/or excluded tags. The nodes may also indicate a flag set (e.g., a drop flag) corresponding to an action to be taken with regard to the data packet. As explained above with respect to FIG. 1, the PG inspector 128a may perform a lookup for the PG of the data packet based on the destination IP. The PG inspector 128a may also create a "PG" tag. The PG tag may contain the PG ID. Responsive to a determination that there is no match for the PG of the data packet, the PG tag may not be created. The PG inspector 128a may return a continue value and the data packet may continue to the blocklist inspector 128b.

The blocklist inspector 128b may include required-tags={PG}. Responsive to a determination that the data packet has the PG tag, the blocklist inspector 128b may retrieve a dynamic blocklist for the PG associated with the data packet. The blocklist inspector 128b may compare a source IP of the data packet against the blocklist. Responsive to a determination that a match exists, the blocklist inspector 128b may tag the data packet with the drop tag. The blocklist inspector 128b may return a continue value and the data packet may continue to the dispatch inspector 128c.

The dispatch inspector 128c may include required-tags={PG} and excluded-tags={drop}. Responsive to a determination by the dispatch inspector 128c that the data packet has the PG tag and does not have the drop tag, the dispatch inspector 128c may inspect a head node of the PG and return the node as a branch target. The dispatch inspector 128c may also return branch {PG chain}. For example, the dispatch inspector 128c may indicate that, responsive to a determination that protection group policy exists for the PG of the data packet, the data packet may bypass any remaining selector nodes 128 in the select chain 126 and branch to the head node of a mitigate chain 130 for that PG, where mitigator nodes 132 for the protection group can inspect the data packet. Responsive to a determination that no match exists, a continue value may be returned and the data packet may continue to the no-op inspector 128d.

The no-op inspector 128d may return a continue value. Further, the next-node may be the act chain 134. In various embodiments, the no-op inspector 128d may inspect the data packet responsive to a determination by the dispatch inspector 128c that no PG was matched to the PG tag of the data packet.

Responsive to inspection at the select chain 126, the mitigate chain 130 may inspect the data packet. For example, the mitigate chain 130 may inspect the data packet responsive to the dispatch inspector 128c determining that a match exists between the tagged protection group of the data packet and a protection group policy.

In various embodiments, a first inspector node 132a in the mitigate chain 130 may inspect the data packet. The first inspector may be a CIDR lookup inspector 132a. The CIDR inspector 132a may parse the data packet and retrieve a source IP of the packet. The CIDR lookup inspector 132a may also retrieve TTL values of the data packet. The CIDR lookup inspector 132a may attempt to retrieve associated ASN and CIDR blocks. Responsive to a determination that a match exists, the CIDR lookup inspector 132a may tag the data packet with the TTL, ASN and CIDR values. A continue value may be returned, indicating that the data packet is to continue to the mitigator node 132b.

Mitigator node 132b may be a CIDR auth bypass inspector. The CIDR auth bypass inspector 132b may include required-tags={TTL, CIDR}. Responsive to a determination that the data packet has been set with the required tags, the values from the CIDR and TTL tags may be compared against expected TTL and CIDR values. The comparison may be based on earlier learning. Responsive to a determination that the match exists, the packet may be tagged with a CIDR_TTL_MATCH tag. The CIDR auth bypass inspector 132b may return a continue value, and the data packet may continue to a TCP authentication inspector 132c.

The TCP Authenticator inspector 132c (also referred to as a TCP Auth inspector 132c) may include excluded-tags={CIDR_TTL_MATCH}. Responsive to a determination that the data packet is not tagged with the CIDR_TTL_MATCH, normal TCP authentication may be performed. Normal TCP authentication may result in tagging the packet with a TCP_AUTH_CHALLENGE tag. The TCP Authenticator inspector 132c may return a continue value. This may indicate that the data packet is to continue to the next node. For example, in the system 200, the last node in the mitigate chain 130 may have a default next-node set to a start of the act chain 134. In various embodiments, the next node may be another mitigator node 132, or any other type of node belonging to a chain that has not yet inspected the data packet.

Within the act chain 134, the TCP_AUTH_CHALLENGE inspector 136a may include required-tags={TCP_AUTH_CHALLENGE}. Responsive to a determination that the data packet matches this condition, a challenge packet may be generated and transmitted. The inspected data packet may be tagged with the drop tag.

The drop inspector 136b may include required-tags={drop}. Thus, the drop inspector 136b may therefore only act on packets with the drop tag. Responsive to a determination that the data packet is tagged with a drop tag, a drop counter may be incremented. Further, the drop inspector 136b may return an abort value, indicating that the inspection of the data packet end.

The forward inspector 136c may include excluded-tags={drop}. In various embodiments, the forward inspector 136c may run last in the act chain 134. If the data packet was previously dropped, then processing may have been aborted and the forward inspector 136c may not inspect the data packet. Responsive to the data packet reaching the forward inspector 136c, the forward inspector 136c may forward the packet towards its destination. The forward inspector 136c may return an abort value, indicating that inspection of the data packet end.

In another example, the PG inspector 128a may have no required or excluded tags. Thus, the PG inspector 128a may match all packets. The PG inspector 128a may run and perform a lookup for the protection group of the data packet based on the destination IP. The PG inspector 128a may create a PG tag containing the PG ID. Responsive to a determination that no match exists, the PG tag may not be created. The PG inspector may return a continue value.

The blocklist inspector 128b may include required-tags={PG}. Responsive to a determination that the data packet is tagged with the PG tag, the blocklist inspector may retrieve a dynamic blacklist for the PG. The blocklist inspector 128b may compare the source IP of the data packet against the blocklist. Responsive to a determination that the match exists, the blocklist inspector 128b may tag the data packet with the drop tag. The blocklist inspector 128b may return a continue value.

The dispatch inspector 128c may include required-tags={PG} and excluded-tags={DROP}. Responsive to a determination that the data packet is tagged with a PG tag and is not tagged with the drop tag, the dispatch inspector 128c may retrieve the DAG 124 for the PG of the data packet. The dispatch inspector 128c may return a branch {PG DAG} value and branch to a first mitigator node 132 of the mitigate chain 130. Responsive to a determination that no match exists, the dispatch inspector 128c may return a continue value.

The no-op inspector 128d may return a continue value. The next-node may indicate the act chain 134. The no-op inspector may run responsive to a determination that no match exists between the PG of the data packet and a DAG of the PG.

The next-node for the last inspector in the mitigate chain 130 may be set to the beginning of the act chain 134. In various embodiments, the last inspector 132 of the mitigate chain 130 may be any of the mitigator nodes 132 described herein or may be an additional mitigator node.

The drop inspector 136b may include required-tags={drop}. Thus, the drop inspector 136b may therefore only act on packets with the drop tag. Responsive to a determination that the data packet is tagged with a drop tag, a drop counter may be incremented. Further, the drop inspector 136b may return an abort value, indicating that the inspection of the data packet end. If an abort value is returned for the data packet, no further execution may be performed for the packet. Otherwise, execution may continue to the default next-node.

The forward inspector may include excluded-tags={drop}. If the packet is not tagged to drop, then the forward inspector may forward the packet and return an abort value.

Figure 3:
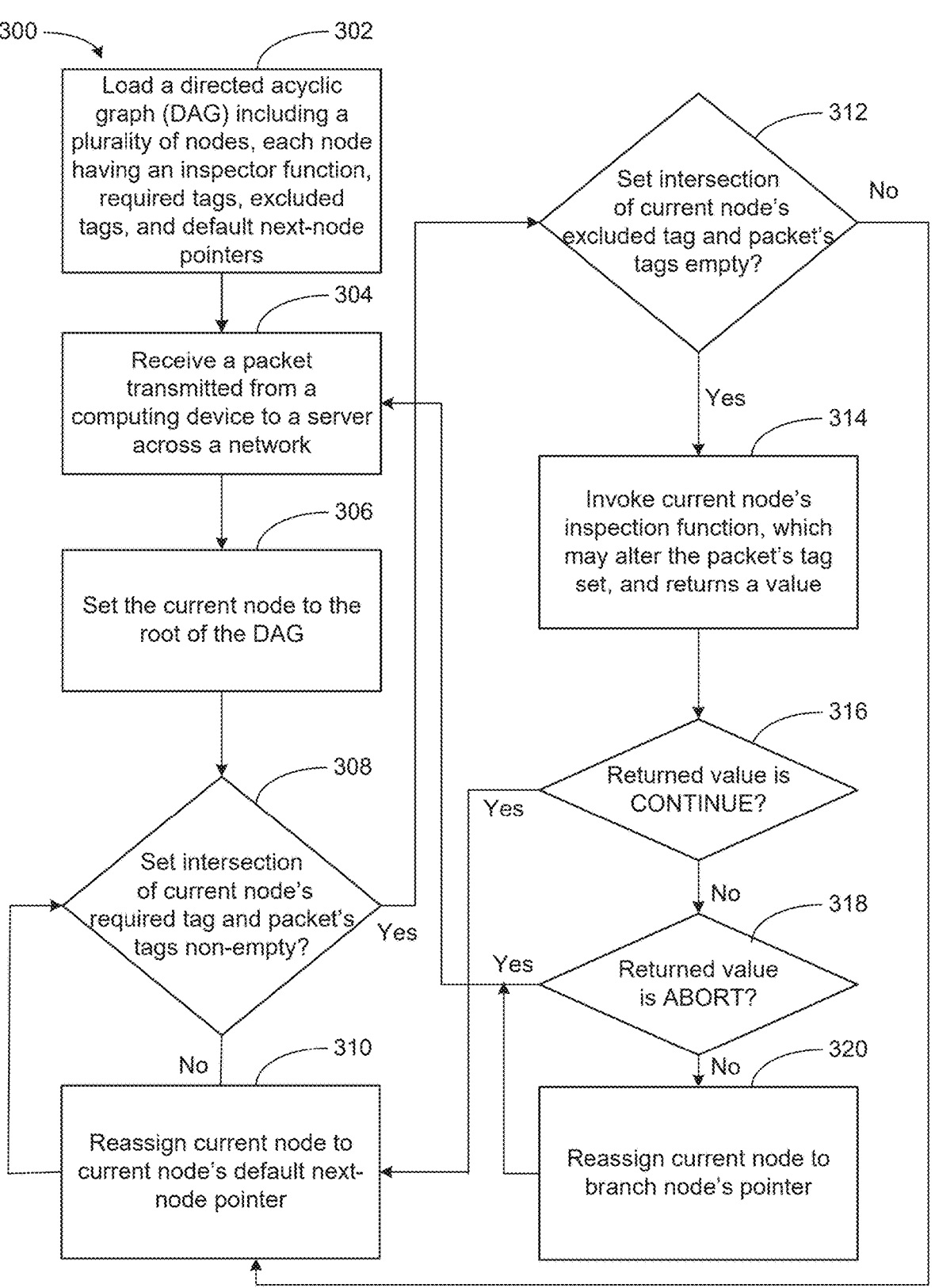
FIG. 3 is an illustration of a flow diagram of a method for moving through a directed acyclic graph, in accordance with an implementation.

Referring now to FIG. 3, a flow diagram of a method 300 for moving through a directed acyclic graph is shown, according to an example embodiment. The method 300 may be performed by one or more components of the data processing system 110. For example, the DAG 124 and corresponding selector nodes 128, mitigator nodes 132, and actor nodes 136 may perform one or more actions described herein.

At operation 302, the data processing system 110 may load a DAG (e.g., the DAG 124). The DAG may include a plurality of nodes. Each node may include an inspector function, required tags, excluded tags, and default next-node pointers. For example, the inspector function may allow a data packet being transmitted to be inspected by the data processing system 110. Each data packet may be tagged with a plurality of tags indicating information about the data packet.

At operation 304, the data processing system 110 may receive a data packet. The data packet may be transmitted from a computing device (e.g., client device 106) to a server (e.g., server 108) across a network (e.g., network 105). The data processing system 110 may be stored in or on the network 105 and may receive data packets as they are transmitted across the network from the client device to the server.

At operation 306, the data processing system 110 may set a current node of the DAG as a root of the DAG. A root of the DAG may be a node that inspects the data packet prior to any other node.

At operation 308, the data processing system 110 may determine whether a set intersection of the required tag of the current node and tags of the data packet is non-empty. For example, the current node may have a set of required tags (e.g., tags that the data packet must be tagged with in order for the node to inspect the data packet). The data packet being transmitted across the network 105 and inspected by the data processing system 110 may be tagged with a plurality of tags. The data processing system 110 may determine whether an intersection of required tags of the node and the tags of the data packet includes tags. For example, the node may include a {PG} required tag, and the data packet may be tagged with a PG. Thus, the set intersection may be non-empty since, the node requires the data packet to have a PG tag, and the data packed is tagged as such.

At operation 310, responsive to a determination at operation 308 that the set intersection is not non-empty (e.g., the set intersection is empty), the data processing system 110 may reassign the current node to the current node's default next-node pointer. For example, at the current node, if there is no intersection of tags, the inspector may not inspect the data packet. Thus, the data packet is forwarded to a subsequent node that becomes a new current node.

At operation 312, responsive to a determination at operation 308 that the set intersection is non-empty, the data processing system 110 may determine whether a set intersection of the excluded tags of the current node and the tags of the data packet is empty. For example, the data processing system 110 may determine whether an intersection of excluded tags of the node and the tags of the data packet includes any tags. For example, the node may include a {PG} excluded tag, and the data packet may not be tagged with a PG. Thus, the set intersection may be empty since the node requires the data packet to not have a PG tag, and the data packed is not tagged as such.

Responsive to a determination at operation 312 that the set intersection of excluded tags and the data packet tags is not empty, the method 300 may return to operation 310. At operation 310, the data processing system 110 may reassign the current node to the current node's default next-node pointer. For example, at the current node, if there is an intersection of excluded tags and data packet tags, the inspector may not inspect the data packet. Thus, the data packet is forwarded to a subsequent node that becomes a new current node.

Responsive to a determination at operation 312 that the set intersection of excluded tags and the data packet tags is empty, the method 300 may continue to operation 314. At operation 314, the data processing system may invoke an inspection function of the current node. For example, the node may inspect the data packet. In various embodiments, inspection of the data packet may alter a tag set of the data packet. For example, upon inspection of the data packet, the node may tag the data packet with an additional tag. The node may also return a value.

At operation 316, the data processing system 110 may determine whether the value returned at operation 314 is a "continue" value. Responsive to a determination that the returned value is a continue value, the method 300 may return to operation 310, where the data processing system 110 may reassign the current node to the current node's default next-node pointer.

Responsive to a determination that the value returned at operation 314 is not a continue value, the method 300 may continue to operation 318. At operation 318, the data processing system 110 may determine whether the value returned at operation 314 is an "abort" value. Responsive to a determination that the returned value is an abort value, the method 300 may return to operation 304, where the data processing system 110 may receive a data packet. For example, if an abort value is returned, inspection of the data packet may cease and a new data packet may be inspected.

Responsive to a determination that the returned value is not an abort value, the method 300 may continue to operation 320. At operation 320, the data processing system 110 may reassign the current node to a pointer of a branch node.

Figure 4:
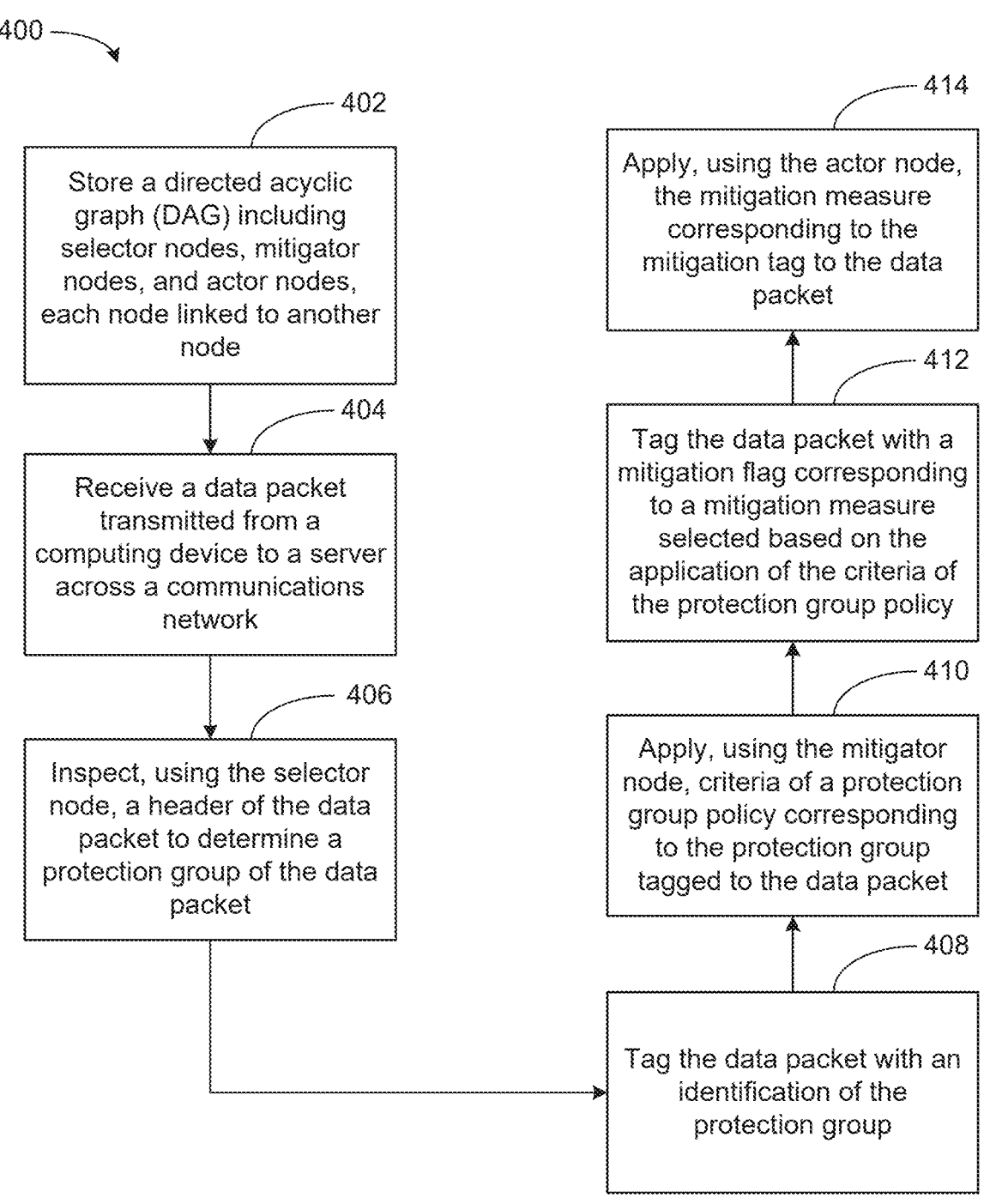
FIG. 4 is an illustration of a flow diagram of a method for utilizing a directed acyclic graph to mitigate a DDOS attack, in accordance with an implementation.

Referring now to FIG. 4, a flow diagram of a method 400 for utilizing a directed acyclic graph to mitigate a DDoS attack is shown, according to an example embodiment. The method 400 may be performed by one or more components of the data processing system 110. For example, the DAG 124 and corresponding selector nodes 128, mitigator nodes 132, and actor nodes 136 may perform one or more actions described herein.

At operation 402, the data processing system 110 may store a directed acyclic graph (DAG). The stored DAG may be, for example, the DAG 124. The DAG may include a plurality of nodes. For example, the DAG may include one or more selector nodes (e.g., selector nodes 128), one or more mitigator nodes (e.g., mitigator nodes 132), and one or more actor nodes (e.g., actor nodes 136). In various embodiments, each of the plurality of nodes may be linked to one another.

In various embodiments, each of the plurality of nodes may be a separate computer program stored in memory of a single computing device. In various embodiments, each of the one or more selector nodes may be linked to at least one of the one or more mitigator nodes with a first edge. In various embodiments, at least one of the one or more mitigator nodes may be linked to at least one of the one or more action nodes with a second edge.

At operation 404, the data processing system 110 (e.g., the data collector 122) may receive a data packet. The data packet may be transmitted from a computing device (e.g., client device 106) to a server (e.g., server 108) across the communications network (e.g., network 105).

At operation 406, at least one of the one or more selector nodes may inspect a header of the data packet received at operation 404. The selector node may inspect the header to determine a protection group for the data packet.

In various embodiments, the at least one of the one or more selector nodes may determine the protection group based on a destination IP address of the data packet or a source IP address of the data packet in the header of the data packet.

At operation 408, the at least one of the one or more selector nodes may tag the data packet with an identification of the protection group. The tag may be a metadata tag. The tag may be based on the inspection of the data packet header at operation 406.

In various embodiments, the data processing system 110 may transfer the data packet through the plurality of nodes of the DAG based on the tags placed on the data packet by individual nodes of the DAG. For example, based on the type of tag placed on the data packet by the selector node(s), the data packet may be transferred through the DAG in different configurations. Responsive to the identification of the protection group, a second selector node of the one or more selector nodes may identify at least one of the one or more mitigator nodes based on the identification of the protection group. The second selector node of the one or more selector nodes may send the data packet to the at least one of the one or more mitigator nodes based on identification of the protection group.

In various embodiments, the data processing system 110 may determine a first intersection between one or more tags of the data packet and a required tag set of a first node of the plurality of nodes. The first node may be currently inspecting the data packet. For example, the data packet may be inspected by a node having a set of tags that the data packet must be tagged with in order to be inspected by the node. The data processing system 110 may determine whether any tags of the data packet are included in the set of required tags of the node. Responsive to a determination that the first intersection does not exist (e.g., the data packet is not tagged with any of the required tags), the data processing system may reassign a second node of the plurality of nodes to inspect the data packet. Thus, a second node may be currently inspecting the data packet.

In various embodiments, responsive to a determination that the first intersection does exist (e.g., the data packet is not tagged with any of the required tags), the data processing system 110 may determine a second intersection between the one or more tags of the data packet and an excluded tag set of the first node of the plurality of nodes. For example, the node may include a set of excluded tags that the data packet cannot be tagged with if the node is to inspect the data packet (e.g., if the data packet is tagged with an excluded tag, the node may not inspect the data packet). Responsive to a determination that the second intersection does not exist, the data processing system may invoke a function of the first node. In various embodiments, invoking a function of the first node may cause at least one tag of the one or more tags of the data packet to be altered (e.g., a new tag is added, an existing tag is removed, etc.).

At operation 410, at least one of the one or more mitigator nodes may apply a protection group policy to the data packet. The mitigator node(s) may apply the protection group policy that corresponds to the protection group determined at operation 406, based on the identification of the protection group tagged to the data packet at operation 408.

In various embodiments, the at least one of the one or more mitigator nodes may apply the one or more criteria of the protection group policy corresponding to the protection group to the data packet responsive to receipt of the data packet from the second selector node at operation 406.

At operation 412, the at least one of the one or more mitigator nodes may tag the data packet with a mitigation flag. The mitigation flag may correspond to a mitigation measure to be taken to prevent or block the attack by the computing device. The mitigator node(s) may select the mitigation measure based on the application of the one or more criteria of the protection group policy to the data packet at operation 410.

In various embodiments, the data processing system 110 may transfer the data packet through the plurality of nodes of the DAG based on the tags placed on the data packet by individual nodes of the DAG. For example, based on the type of tag placed on the data packet by the mitigator node(s), the data packet may be transferred through the DAG in different configurations.

At operation 414, at least one of the one or more actor nodes may apply the mitigation measure determined at operation 412 to the data packet. The mitigation measure may correspond to the mitigation tag tagged by the mitigator node(s) at operation 410.

In various embodiments, at least one of the one or more actor nodes may execute the at least one mitigator node of the one or more mitigator nodes on the data packet based on the identification of the protection group tag corresponding to a required tag of the at least one mitigator node. In various embodiments, the at least one of the one or more actor nodes may determine not to execute a second mitigator node of the one or more mitigator nodes on the data packet based on the identification of the protection group tag corresponding to an excluded tag of the second mitigator node.

In various embodiments, the at least one of the one or more actor nodes may apply the mitigation measure by dropping a data packet of the one or more data packets responsive to determining that the data packet corresponds to the attack based on the application of the DAG. In various embodiments, the at least one of the one or more actor nodes may apply the mitigation measure by blocking the data packet from reaching the server or forwarding the data packet to the server.

Referring now to FIG. 5, a flow diagram of a method 500 for selecting a configuration of a DAG is shown, according to an example embodiment. The method 500 may utilize one or more operations or processes described above with respect to the method 400.

At operation 502, the data processing system 110 stores a directed acyclic graph (DAG). The DAG may include a plurality of nodes. The plurality of nodes may include one or more selector nodes, one or more mitigator nodes, and one or more actor nodes. Each of the plurality of nodes may be linked to another node of the plurality of nodes.

At operation 504, the data processing system 110 may receive a data packet. The data packet may be transmitted from a computing device to the server across the communications network.

At operation 506, the data processing system 110 may apply the DAG configured according to the selected configuration to the data packet. The data processing system 110 may apply the DAG to determine a mitigation action for the data packet. In various embodiments, at least one mitigator node of a plurality of mitigator nodes may determine the mitigation action for the data packet.

At process 508, the data processing system 110 may apply the mitigation measure to the data packet. For example, at least one actor node of a plurality of actor nodes may apply the mitigation measure.

In various embodiments, the at least one actor node of a plurality of actor nodes may apply the mitigation measure by dropping a data packet of the one or more data packets responsive to determining that the data packet corresponds to the attack based on the application of the DAG. In various embodiments, the at least one actor node of a plurality of actor nodes may apply the mitigation measure by blocking the data packet from reaching the server or forwarding the data packet to the server.

In various embodiments, the data processing system 110 may determine a first intersection between one or more tags of the data packet and a required tag set of a first node of the plurality of nodes. The first node may be currently inspecting the data packet. For example, the data packet may be inspected by a node having a set of tags that the data packet must be tagged with in order to be inspected by the node. The data processing system 110 may determine whether any tags of the data packet are included in the set of required tags of the node. Responsive to a determination that the first intersection does not exist (e.g., the data packet is not tagged with any of the required tags), the data processing system may reassign a second node of the plurality of nodes to inspect the data packet. Thus, a second node may be currently inspecting the data packet.

Figure 6A:
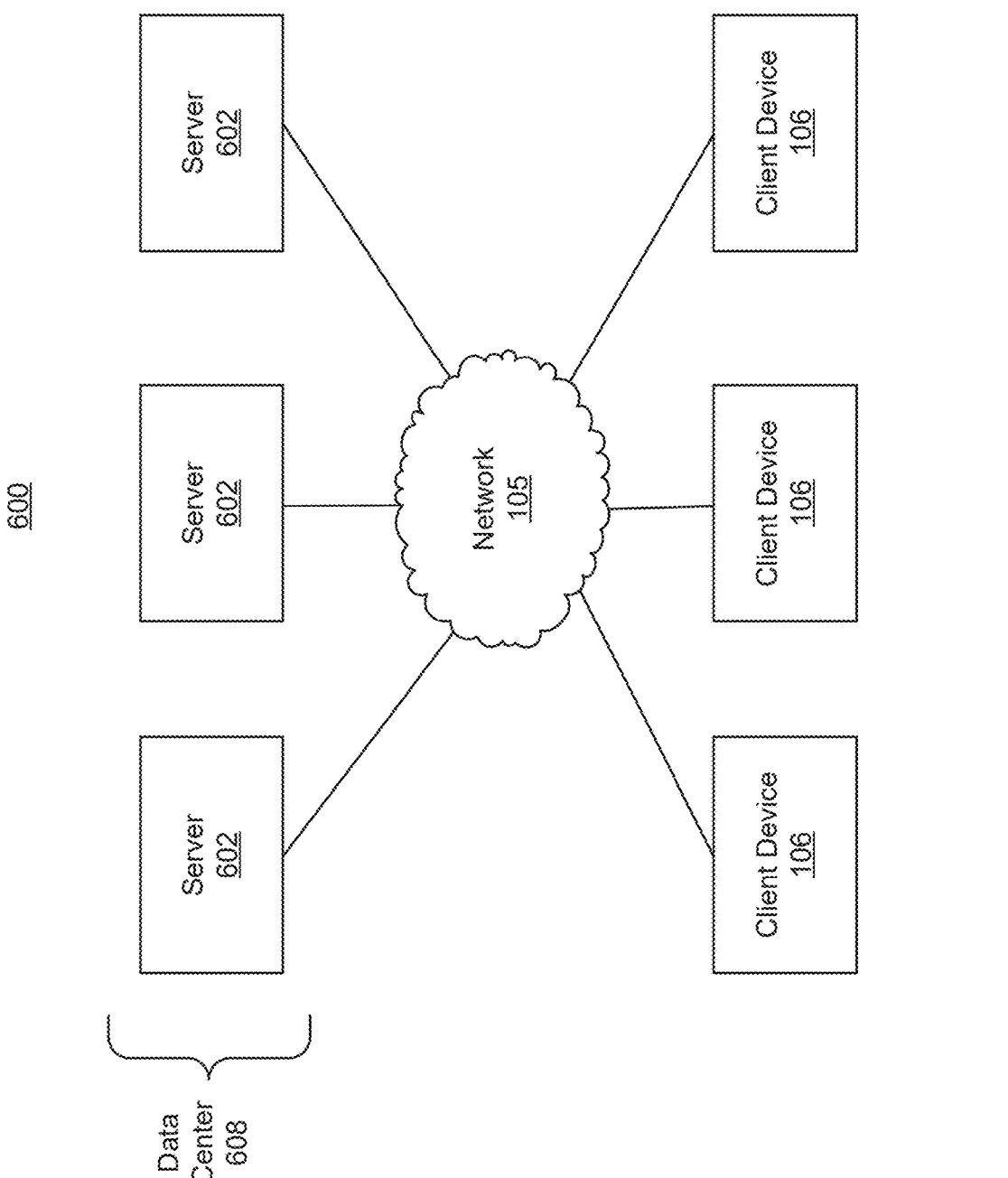
FIG. 6A is a block diagram depicting an implementation of a network environment including a client device in communication with a server device.

FIG. 6A depicts an example network environment that can be used in connection with the methods and systems described herein. In brief overview, the network environment 600 includes one or more client devices 106 (also generally referred to as clients, client node, client machines, client computers, client computing devices, endpoints, or endpoint nodes) in communication with one or more servers 602 (also generally referred to as servers, nodes, or remote machine) via one or more networks 105. In some embodiments, a client 106 has the capacity to function as both a client node seeking access to resources provided by a server and as a server providing access to hosted resources for other client devices 106.

Although FIG. 6A shows a network 105 between the client devices 106 and the servers 602, the client devices 106 and the servers 602 can be on the same network 105. In embodiments, there are multiple networks 105 between the client devices 106 and the servers 602. The network 105 can include multiple networks such as a private network and a public network. The network 105 can include multiple private networks.

The network 105 can be connected via wired or wireless links. Wired links can include Digital Subscriber Line (DSL), coaxial cable lines, or optical fiber lines. The wireless links can include BLUETOOTH, Wi-Fi, Worldwide Interoperability for Microwave Access (WiMAX), an infrared channel or satellite band. The wireless links can also include any cellular network standards used to communicate among mobile devices, including standards that qualify as 1G, 2G, 3G, 4G, 5G or other standards. The network standards can qualify as one or more generation of mobile telecommunication standards by fulfilling a specification or standards such as the specifications maintained by International Telecommunication Union. Examples of cellular network standards include AMPS, GSM, GPRS, UMTS, LTE, LTE Advanced, Mobile WiMAX, and WiMAX-Advanced. Cellular network standards can use various channel access methods e.g., FDMA, TDMA, CDMA, or SDMA. In some embodiments, different types of data can be transmitted via different links and standards. In other embodiments, the same types of data can be transmitted via different links and standards.

The network 105 can be any type and/or form of network. The geographical scope of the network 105 can vary widely and the network 105 can be a body area network (BAN), a personal area network (PAN), a local-area network (LAN), e.g., Intranet, a metropolitan area network (MAN), a wide area network (WAN), or the Internet. The topology of the network 105 can be of any form and can include, e.g., any of the following: point-to-point, bus, star, ring, mesh, or tree. The network 105 can be an overlay network which is virtual and sits on top of one or more layers of other networks 105. The network 105 can be of any such network topology as known to those ordinarily skilled in the art capable of supporting the operations described herein. The network 105 can utilize different techniques and layers or stacks of protocols, including, e.g., the Ethernet protocol or the internet protocol suite (TCP/IP). The TCP/IP internet protocol suite can include application layer, transport layer, internet layer (including, e.g., IPv6), or the link layer. The network 105 can be a type of a broadcast network, a telecommunications network, a data communication network, or a computer network.

The network environment 600 can include multiple, logically grouped servers 602. The logical group of servers can be referred to as a data center 608 (or server farm or machine farm). In embodiments, the servers 602 can be geographically dispersed. The data center 608 can be administered as a single entity or different entities. The data center 608 can include multiple data centers 608 that can be geographically dispersed. The servers 602 within each data center 608 can be homogeneous or heterogeneous (e.g., one or more of the servers 602 or machines 602 can operate according to one type of operating system platform (e.g., WINDOWS NT, manufactured by Microsoft Corp. of Redmond, Washington), while one or more of the other servers 602 can operate on according to another type of operating system platform (e.g., Unix, Linux, or Mac OS X)). The servers 602 of each data center 608 do not need to be physically proximate to another server 602 in the same machine farm 608. Thus, the group of servers 602 logically grouped as a data center 608 can be interconnected using a network. Management of the data center 608 can be de-centralized. For example, one or more servers 602 can comprise components, subsystems and modules to support one or more management services for the data center 608.

Server 602 can be a file server, application server, web server, proxy server, appliance, network appliance, gateway, gateway server, virtualization server, deployment server, SSL VPN server, or firewall. In embodiments, the server 602 can be referred to as a remote machine or a node. Multiple nodes can be in the path between any two communicating servers.

Figure 6B:
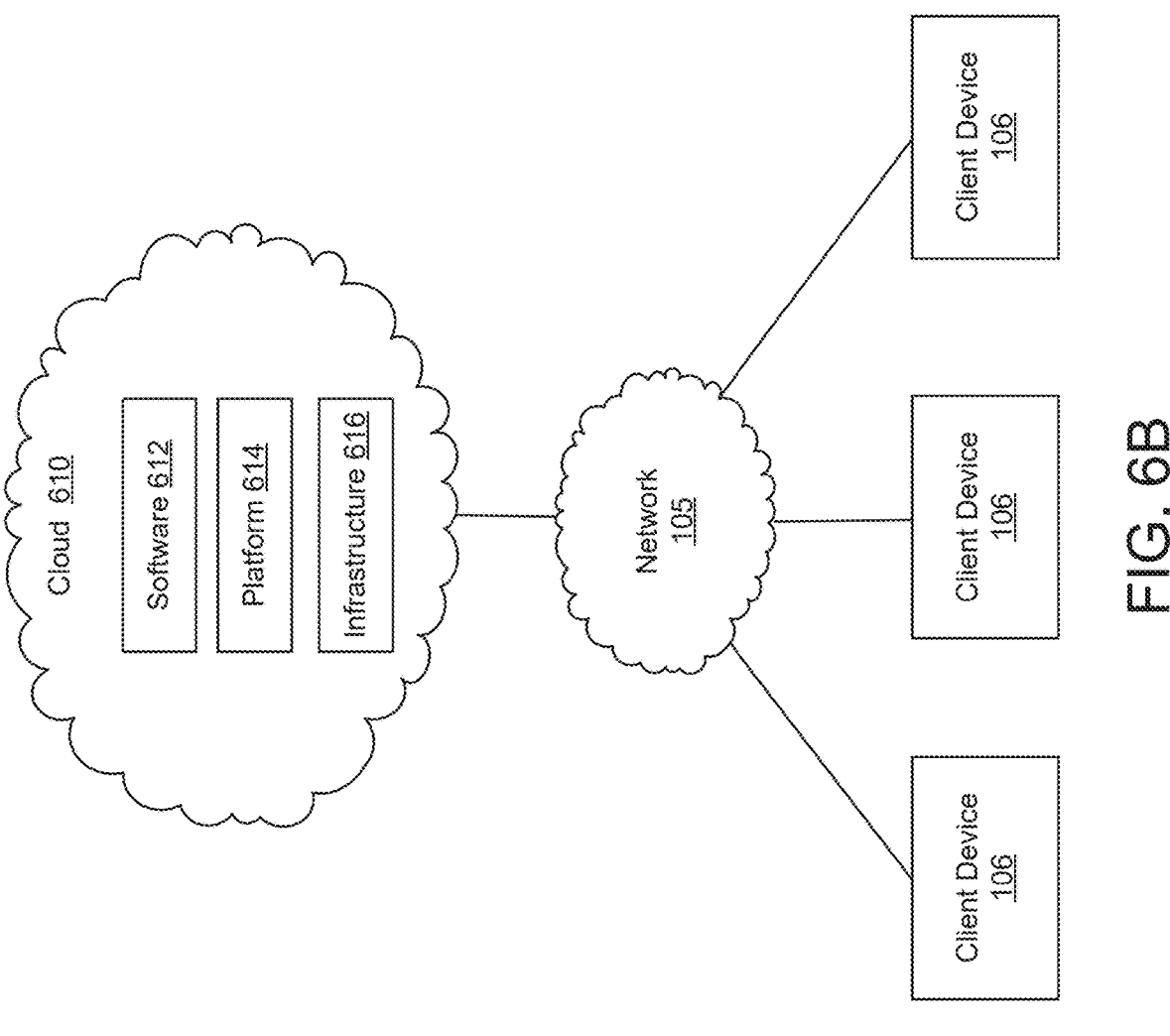
FIG. 6B is a block diagram depicting a cloud computing environment including a client device in communication with cloud servers.

FIG. 6B illustrates an example cloud computing environment. A cloud computing environment 601 can provide client 106 with one or more resources provided by a network environment. The cloud computing environment 601 can include one or more client devices 106, in communication with the cloud 610 over one or more networks 105. Client devices 106 can include, e.g., thick clients, thin clients, and zero clients. A thick client can provide at least some functionality even when disconnected from the cloud 610 or servers 602. A thin client or a zero client can depend on the connection to the cloud 610 or server 602 to provide functionality. A zero client can depend on the cloud 610 or other networks 105 or servers 602 to retrieve operating system data for the client device. The cloud 610 can include back-end platforms, e.g., servers 602, storage, server farms or data centers.

The cloud 610 can be public, private, or hybrid. Public clouds can include public servers 602 that are maintained by third parties to the client devices 106 or the owners of the clients. The servers 602 can be located off-site in remote geographical locations as disclosed above or otherwise. Public clouds can be connected to the servers 602 over a public network. Private clouds can include private servers 602 that are physically maintained by client devices 106 or owners of clients. Private clouds can be connected to the servers 602 over a private network 105. Hybrid clouds 608 can include both the private and public networks 105 and servers 602.

The cloud 610 can also include a cloud-based delivery, e.g., Software as a Service (Saas) 612, Platform as a Service (PaaS) 614, and the Infrastructure as a Service (IaaS) 616. IaaS can refer to a user renting the use of infrastructure resources that are needed during a specified time period. IaaS providers can offer storage, networking, servers or virtualization resources from large pools, allowing the users to quickly scale up by accessing more resources as needed. PaaS providers can offer functionality provided by IaaS, including, e.g., storage, networking, servers or virtualization, as well as additional resources such as, e.g., the operating system, middleware, or runtime resources. SaaS providers can offer the resources that PaaS provides, including storage, networking, servers, virtualization, operating system, middleware, or runtime resources. In some embodiments, SaaS providers can offer additional resources including, e.g., data and application resources.

Client devices 106 can access IaaS resources, SaaS resources, or PaaS resources. In embodiments, access to IaaS, PaaS, or SaaS resources can be authenticated. For example, a server or authentication server can authenticate a user via security certificates, HTTPS, or API keys. API keys can include various encryption standards such as, e.g., Advanced Encryption Standard (AES). Data resources can be sent over Transport Layer Security (TLS) or Secure Sockets Layer (SSL).

The client 106 and server 602 can be deployed as and/or executed on any type and form of computing device, e.g., a computer, network device or appliance capable of communicating on any type and form of network and performing the operations described herein.

Figure 6C:
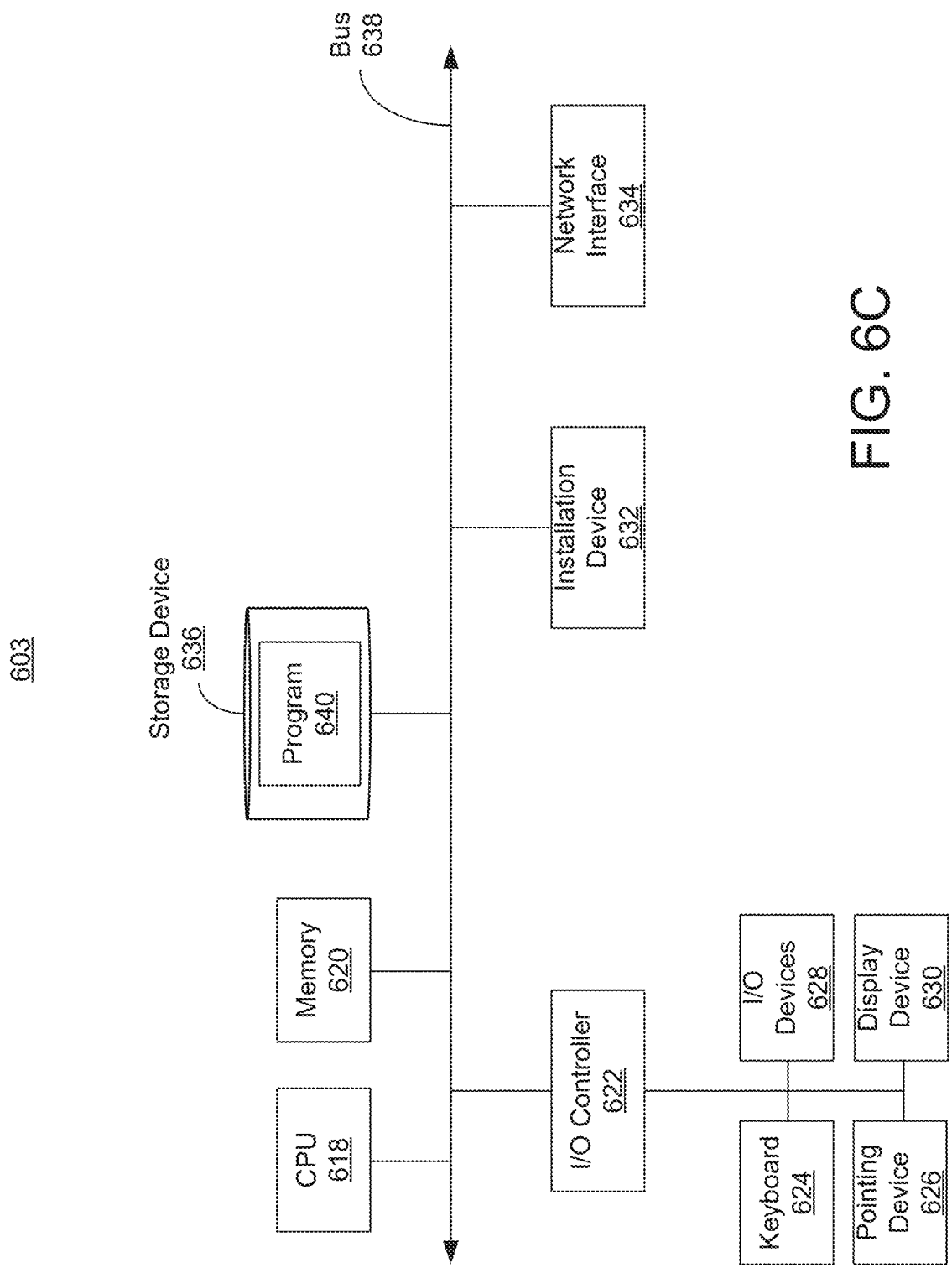
FIG. 6C is a block diagram depicting an implementation of a computing device that can be used in connection with the system depicted in FIG. 1, and the methods depicted in FIGS. 2-5.

FIG. 6C depicts block diagrams of a computing device 603 useful for practicing an embodiment of the client 106 or a server 602. As shown in FIG. 6C, each computing device 603 can include a central processing unit 618, and a main memory unit 620. As shown in FIG. 6C, a computing device 603 can include one or more of a storage device 636, an installation device 632, a network interface 634, an I/O controller 622, a display device 630, a keyboard 624 or a pointing device 626, e.g., a mouse. The storage device 636 can include, without limitation, a program 640, such as an operating system, software, or software associated with system 100.

The central processing unit 618 is any logic circuitry that responds to and processes instructions fetched from the main memory unit 620. The central processing unit 618 can be provided by a microprocessor unit, e.g.: those manufactured by Intel Corporation of Mountain View, California. The computing device 603 can be based on any of these processors, or any other processor capable of operating as described herein. The central processing unit 618 can utilize instruction level parallelism, thread level parallelism, different levels of cache, and multi-core processors. A multi-core processor can include two or more processing units on a single computing component.

Main memory unit 620 can include one or more memory chips capable of storing data and allowing any storage location to be directly accessed by the microprocessor 618. Main memory unit 620 can be volatile and faster than storage 636 memory. Main memory units 620 can be Dynamic random-access memory (DRAM) or any variants, including static random access memory (SRAM). The memory 620 or the storage 636 can be non-volatile; e.g., non-volatile read access memory (NVRAM). The memory 620 can be based on any type of memory chip, or any other available memory chips. In the example depicted in FIG. 6C, the processor 618 can communicate with memory 620 via a system bus 638.

A wide variety of I/O devices 628 can be present in the computing device 603. Input devices 628 can include keyboards, mice, trackpads, trackballs, touchpads, touch mice, multi-touch touchpads and touch mice, microphones, multi-array microphones, drawing tablets, cameras, or other sensors. Output devices can include video displays, graphical displays, speakers, headphones, or printers.

I/O devices 628 can have both input and output capabilities, including, e.g., haptic feedback devices, touchscreen displays, or multi-touch displays. Touchscreen, multi-touch displays, touchpads, touch mice, or other touch sensing devices can use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices can allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, can have larger surfaces, such as on a table-top or on a wall, and can also interact with other electronic devices. Some I/O devices 628, display devices 630 or group of devices can be augmented reality devices. The I/O devices can be controlled by an I/O controller 622 as shown in FIG. 6C. The I/O controller 622 can control one or more I/O devices, such as, e.g., a keyboard 624 and a pointing device 626, e.g., a mouse or optical pen. Furthermore, an I/O device can also provide storage and/or an installation device 632 for the computing device 603. In embodiments, the computing device 603 can provide USB connections (not shown) to receive handheld USB storage devices. In embodiments, an I/O device 628 can be a bridge between the system bus 638 and an external communication bus, e.g., a USB bus, a SCSI bus, a FireWire bus, an Ethernet bus, a Gigabit Ethernet bus, a Fibre Channel bus, or a Thunderbolt bus.

In embodiments, display devices 630 can be connected to I/O controller 622. Display devices can include, e.g., liquid crystal displays (LCD), electronic papers (e-ink) displays, flexile displays, light emitting diode displays (LED), or other types of displays. In some embodiments, display devices 630 or the corresponding I/O controllers 622 can be controlled through or have hardware support for OPENGL or DIRECTX API or other graphics libraries. Any of the I/O devices 628 and/or the I/O controller 622 can include any type and/or form of suitable hardware, software, or combination of hardware and software to support, enable or provide for the connection and use of one or more display devices 630 by the computing device 603. For example, the computing device 603 can include any type and/or form of video adapter, video card, driver, and/or library to interface, communicate, connect or otherwise use the display devices 630. In embodiments, a video adapter can include multiple connectors to interface to multiple display devices 630.

The computing device 603 can include a storage device 636 (e.g., one or more hard disk drives or redundant arrays of independent disks) for storing an operating system or other related software, and for storing application software programs 640 such as any program related to the systems, methods, components, modules, elements, or functions depicted in FIG. 1, or 2. Examples of storage device 636 include, e.g., hard disk drive (HDD); optical drive including CD drive, DVD drive, or BLU-RAY drive; solid-state drive (SSD); USB flash drive; or any other device suitable for storing data. Storage devices 636 can include multiple volatile and non-volatile memories, including, e.g., solid state hybrid drives that combine hard disks with solid state cache. Storage devices 636 can be non-volatile, mutable, or read-only. Storage devices 636 can be internal and connect to the computing device 603 via a bus 638. Storage device 636 can be external and connect to the computing device 603 via an I/O device 630 that provides an external bus. Storage device 636 can connect to the computing device 603 via the network interface 634 over a network 105. Some client devices 106 may not require a non-volatile storage device 636 and can be thin clients or zero client devices 106. Some storage devices 636 can be used as an installation device 632 and can be suitable for installing software and programs.

The computing device 603 can include a network interface 634 to interface to the network 105 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The computing device 603 can communicate with other computing devices 602 via any type and/or form of gateway or tunneling protocol e.g. Secure Socket Layer (SSL) or Transport Layer Security (TLS), QUIC protocol, or the Citrix Gateway Protocol manufactured by Citrix Systems, Inc. of Ft. Lauderdale, Florida. The network interface 634 can include a built-in network adapter, network interface card, PCMCIA network card, EXPRESSCARD network card, card bus network adapter, wireless network adapter, USB network adapter, modem or any other device suitable for interfacing the computing device 603 to any type of network capable of communication and performing the operations described herein.

A computing device 603 of the sort depicted in FIG. 6C can operate under the control of an operating system, which controls scheduling of tasks and access to system resources. The computing device 603 can be running any operating system configured for any type of computing device, including, for example, a desktop operating system, a mobile device operating system, a tablet operating system, or a smartphone operating system.

The computing device 603 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computing device 603 has sufficient processor power and memory capacity to perform the operations described herein. In some embodiments, the computing device 603 can have different processors, operating systems, and input devices consistent with the device.

In embodiments, the status of one or more machines 106, 603 in the network 105 can be monitored as part of network management. In embodiments, the status of a machine can include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information can be identified by a plurality of metrics, and the plurality of metrics can be applied at least in part towards decisions in load distribution, network traffic management, and network failure recovery as well as any aspects of operations of the present solution described herein.

The processes, systems and methods described herein can be implemented by the computing device 603 in response to the CPU 618 executing an arrangement of instructions contained in main memory 620. Such instructions can be read into main memory 620 from another computer-readable medium, such as the storage device 636. Execution of the arrangement of instructions contained in main memory 620 causes the computing device 603 to perform the illustrative processes described herein. One or more processors in a multi-processing arrangement may also be employed to execute the instructions contained in main memory 620. Hard-wired circuitry can be used in place of or in combination with software instructions together with the systems and methods described herein. Systems and methods described herein are not limited to any specific combination of hardware circuitry and software.

Although an example computing system has been described in FIG. 6, the subject matter including the operations described in this specification can be implemented in other types of digital electronic circuitry, or in computer software, firmware, or hardware, including the structures disclosed in this specification and their structural equivalents, or in combinations of one or more of them.

One aspect relates to a system. The system includes one or more processors coupled with memory, the memory storing executable instructions that, when executed by the one or more processors, cause the one or more processors to store a directed acyclic graph (DAG) including a plurality of nodes, the plurality of nodes including one or more selector nodes, one or more mitigator nodes, and one or more actor nodes, each of the plurality of nodes linked to another node of the plurality of nodes, receive a data packet transmitted from a computing device to a server across a communications network, inspect, using at least one of one or more of the selector nodes, a header of the data packet to determine a protection group for the data packet, tag the data packet with an identification of the protection group based on the inspection, apply, using at least one of the one or more mitigator nodes, one or more criteria of a protection group policy corresponding to the protection group to the data packet based on the identification of the protection group tagged to the data packet, tag the data packet with a mitigation flag corresponding to a mitigation measure selected based on the application of the one or more criteria of the protection group policy to the data packet, and apply, using at least one of the one or more actor nodes, the mitigation measure corresponding to the mitigation tag to the data packet.

In some embodiments, the instructions further cause the one or more processors to determine a first intersection between one or more tags of the data packet and a required tag set of a first node of the plurality of nodes. The first node may currently be inspecting the data packet. Responsive to a determination that the first intersection does not exist, the instructions further cause the one or more processors to reassign a second node of the plurality of nodes to currently inspect the data packet.

In some embodiments, the instructions further cause the one or more processors to, responsive to a determination that the first intersection does exist, determine a second intersection between the one or more tags of the data packet and an excluded tag set of the first node of the plurality of nodes. In some embodiments, responsive to a determination that an intersection does not exist, the instructions further cause the one or more processors to invoke a function of the first node.

Invoking a function of the first node may cause at least one tag of the one or more tags of the data packet to be altered.

In some embodiments, each of the plurality of nodes is a separate computer program stored in memory of a single computing device. In some embodiments, each of the one or more selector nodes is linked to at least one of the one or more mitigator nodes with a first edge, and each of the one or more mitigator nodes is linked to at least one of the one or more action nodes with a second edge. In some embodiments, the instructions cause the one or more processors to determine the protection group using the at least one selector node based on a destination IP address of the data packet or a source IP address of the data packet in the header of the data packet. In some embodiments, the instructions cause the one or more processors to transfer the data packet through the plurality of nodes of the DAG based on tags placed on the data packet by individual nodes of the DAG. In some embodiments, the instructions cause the one or more processors to execute the at least one mitigator node of the one or more mitigator nodes on the data packet based on the identification of the protection group tag corresponding to a required tag of the at least one mitigator node. In some embodiments, the instructions cause the one or more processors to determine not to execute a second mitigator node of the one or more mitigator nodes on the data packet based on the identification of the protection group tag corresponding to an excluded tag of the second mitigator node. In some embodiments, the instructions cause the one or more processors to, responsive to the identification of the protection group, identify, using a second selector node of the one or more selector nodes, the at least one of the one or more mitigator nodes based on the identification of the protection group, and send the data packet to the at least one of the one or more mitigator nodes based on identification of the protection group. The instructions cause the one or more processors to apply the one or more criteria of the protection group policy corresponding to the protection group to the data packet responsive to receipt of the data packet from the second selector node.

At least one aspect relates to a method. The method includes storing, via one or more processors, a directed acyclic graph (DAG) including a plurality of nodes, the plurality of nodes including one or more selector nodes, one or more mitigator nodes, and one or more actor nodes, each of the plurality of nodes linked to another node of the plurality of nodes, receiving, via the one or more processors, a data packet transmitted from a computing device to a server across a communications network, inspecting, via the one or more processors, using at least one of one or more of the selector nodes, a header of the data packet to determine a protection group for the data packet, tagging, via the one or more processors, the data packet with an identification of the protection group based on the inspection, applying, via the one or more processors, using at least one of the one or more mitigator nodes, one or more criteria of a protection group policy corresponding to the protection group to the data packet based on the identification of the protection group tagged to the data packet, tagging, via the one or more processors, the data packet with a mitigation flag corresponding to a mitigation measure selected based on the application of the one or more criteria of the protection group policy to the data packet, and applying, via the one or more processors, using at least one of the one or more actor nodes, the mitigation measure corresponding to the mitigation tag to the data packet.

In some embodiments, the method further includes determining a first intersection between one or more tags of the data packet and a required tag set of a first node of the plurality of nodes. The first node may currently be inspecting the data packet. The method may further include, responsive to a determination that the first intersection does not exist, reassigning a second node of the plurality of nodes to currently inspect the data packet.

In some embodiments, the method further includes, responsive to a determination that the first intersection does exist, determining a second intersection between the one or more tags of the data packet and an excluded tag set of the first node of the plurality of nodes. In some embodiments, the method further includes, responsive to a determination that an intersection does not exist, invoking a function of the first node. Invoking a function of the first node may cause at least one tag of the one or more tags of the data packet to be altered.

At least one aspect relates to a system. The system includes one or more processors coupled with memory, the memory storing executable instructions that, when executed by the one or more processors, cause the one or more processors to store a directed acyclic graph (DAG) including a plurality of nodes, the plurality of nodes including one or more selector nodes, one or more mitigator nodes, and one or more actor nodes, each of the plurality of nodes linked to another node of the plurality of nodes, receive a data packet transmitted from a computing device to the server across the communications network, apply the DAG configured according to the selected configuration to the data packet to determine a mitigation action for the data packet, and apply the mitigation measure to the data packet.

In some embodiments, the instructions further cause the one or more processors to determine a first intersection between one or more tags of the data packet and a required tag set of a first node of the plurality of nodes. The first node may currently be inspecting the data packet. Responsive to a determination that the first intersection does not exist, the instructions further cause the one or more processors to reassign a second node of the plurality of nodes to currently inspect the data packet. In some embodiments, the instructions cause the one or more processors to apply the mitigation measure by dropping a data packet of the one or more data packets based on the application of the DAG. In some embodiments, the instructions cause the one or more processors to apply the mitigation measure by blocking the data packet from reaching the server or forwarding the data packet to the server.

The foregoing detailed description includes illustrative examples of various aspects and embodiments and provides an overview or framework for understanding the nature and character of the claimed aspects and embodiments. The drawings provide illustration and a further understanding of the various aspects and embodiments and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 110) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all embodiments, and the described program components can be included in a single hardware or software product.

The phraseology and terminology used herein is for the purpose of description and should not be regarded as limiting. Any references to embodiments or elements or acts of the systems and methods herein referred to in the singular may also embrace embodiments including a plurality of these elements, and any references in plural to any implementation or element or act herein may also embrace embodiments including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing embodiments are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system comprising:

one or more processors coupled with memory, the memory storing executable instructions that, when executed by the one or more processors, cause the one or more processors to:

store a directed acyclic graph (DAG) comprising a plurality of nodes, the plurality of nodes comprising one or more selector nodes, one or more mitigator nodes, and one or more actor nodes, each of the plurality of nodes linked to another node of the plurality of nodes;

receive a data packet transmitted from a computing device to a server across a communications network;

inspect, using at least one of one or more of the selector nodes, a header of the data packet to determine a protection group for the data packet;

tag the data packet with an identification of the protection group based on the inspection;

apply, using at least one of the one or more mitigator nodes, one or more criteria of a protection group policy corresponding to the protection group to the data packet based on the identification of the protection group tagged to the data packet;

tag the data packet with a mitigation flag corresponding to a mitigation measure selected based on the application of the one or more criteria of the protection group policy to the data packet; and apply, using at least one of the one or more actor nodes, the mitigation measure corresponding to the mitigation tag to the data packet.

2. The system of claim 1, wherein the instructions further cause the one or more processors to:

determine a first intersection between one or more tags of the data packet and a required tag set of a first node of the plurality of nodes, wherein the first node is currently inspecting the data packet; and responsive to a determination that the first intersection does not exist, reassign a second node of the plurality of nodes to currently inspect the data packet.

3. The system of claim 2, wherein the instructions further cause the one or more processors to:
 responsive to a determination that the first intersection does exist, determine a second intersection between the one or more tags of the data packet and an excluded tag set of the first node of the plurality of nodes; and
 responsive to a determination that an intersection does not exist, invoke a function of the first node, wherein invoking a function of the first node causes at least one tag of the one or more tags of the data packet to be altered.

4. The system of claim 1, wherein the instructions cause the one or more processors to apply the mitigation measure by dropping a data packet of the one or more data packets based on the application of the DAG.

5. The system of claim 1, wherein the instructions cause the one or more processors to apply the mitigation measure by forwarding the data packet to the server.

6. The system of claim 1, wherein each of the plurality of nodes is a separate computer program stored in memory of a single computing device.

7. The system of claim 1, wherein each of the one or more selector nodes is linked to at least one of the one or more mitigator nodes with a first edge, and
 wherein each of the one or more mitigator nodes is linked to at least one of the one or more action nodes with a second edge.

8. The system of claim 1, wherein the instructions cause the one or more processors to determine the protection group using the at least one selector node based on a destination IP address of the data packet or a source IP address of the data packet in the header of the data packet.

9. The system of claim 1, wherein the instructions cause the one or more processors to transfer the data packet through the plurality of nodes of the DAG based on tags placed on the data packet by individual nodes of the DAG.

10. The system of claim 9, wherein the instructions cause the one or more processors to:
 responsive to the identification of the protection group, identify, using a second selector node of the one or more selector nodes, the at least one of the one or more mitigator nodes based on the identification of the protection group; and
 send the data packet to the at least one of the one or more mitigator nodes based on identification of the protection group,
 wherein the instructions cause the one or more processors to apply the one or more criteria of the protection group policy corresponding to the protection group to the data packet responsive to receipt of the data packet from the second selector node.

11. The system of claim 1, wherein the instructions cause the one or more processors to execute the at least one mitigator node of the one or more mitigator nodes on the data packet based on the identification of the protection group tag corresponding to a required tag of the at least one mitigator node.

12. The system of claim 11, wherein the instructions cause the one or more processors to determine not to execute a second mitigator node of the one or more mitigator nodes on the data packet based on the identification of the protection group tag corresponding to an excluded tag of the second mitigator node.

13. A method comprising:
 storing, via one or more processors, a directed acyclic graph (DAG) comprising a plurality of nodes, the plurality of nodes comprising one or more selector nodes, one or more mitigator nodes, and one or more actor nodes, each of the plurality of nodes linked to another node of the plurality of nodes;
 receiving, via the one or more processors, a data packet transmitted from a computing device to a server across a communications network;
 inspecting, via the one or more processors, using at least one of one or more of the selector nodes, a header of the data packet to determine a protection group for the data packet;
 tagging, via the one or more processors, the data packet with an identification of the protection group based on the inspection;
 applying, via the one or more processors, using at least one of the one or more mitigator nodes, one or more criteria of a protection group policy corresponding to the protection group to the data packet based on the identification of the protection group tagged to the data packet;
 tagging, via the one or more processors, the data packet with a mitigation flag corresponding to a mitigation measure selected based on the application of the one or more criteria of the protection group policy to the data packet; and
 applying, via the one or more processors, using at least one of the one or more actor nodes, the mitigation measure corresponding to the mitigation tag to the data packet.

14. The method of claim 13, wherein the method further comprises:
 determining a first intersection between one or more tags of the data packet and a required tag set of a first node of the plurality of nodes, wherein the first node is currently inspecting the data packet; and
 responsive to a determination that the first intersection does not exist, reassigning a second node of the plurality of nodes to currently inspect the data packet.

15. The method of claim 14, wherein method further comprises:
 responsive to a determination that the first intersection does exist, determining a second intersection between the one or more tags of the data packet and an excluded tag set of the first node of the plurality of nodes; and
 responsive to a determination that an intersection does not exist, invoking a function of the first node, wherein invoking a function of the first node causes at least one tag of the one or more tags of the data packet to be altered.

16. The method of claim 14, wherein the method further comprises applying the mitigation measure by dropping a data packet of the one or more data packets based on the application of the DAG.

17. A system comprising:
 one or more processors coupled with memory, the memory storing executable instructions that, when executed by the one or more processors, cause the one or more processors to:
 store a directed acyclic graph (DAG) comprising a plurality of nodes, the plurality of nodes comprising one or more selector nodes, one or more mitigator nodes, and one or more actor nodes, each of the plurality of nodes linked to another node of the plurality of nodes;

receive a data packet transmitted from a computing device to the server across the communications network;

inspect, using at least one of the one or more selector nodes, a header of the data packet to determine a protection group for the data packet;

apply, using at least one of the one or more mitigator nodes, one or more criteria of a protection group policy corresponding to the protection group to the data packet;

apply the DAG configured according to a selected configuration to the data packet to determine a mitigation action for the data packet; and apply, using at least one of the one or more actor nodes, the mitigation measure to the data packet.

18. The system of claim 17, wherein the instructions further cause the one or more processors to:

determine a first intersection between one or more tags of the data packet and a required tag set of a first node of the plurality of nodes, wherein the first node is currently inspecting the data packet; and responsive to a determination that the first intersection does not exist, reassign a second node of the plurality of nodes to inspect the data packet.

19. The system of claim 18, wherein the instructions cause the one or more processors to apply the mitigation measure by forwarding the data packet to the server.

20. The system of claim 17, wherein the instructions cause the one or more processors to apply the mitigation measure by dropping a data packet of the one or more data packets based on the application of the DAG.

* * * * *